United States Patent
Allo

(10) Patent No.: US 10,855,451 B1
(45) Date of Patent: *Dec. 1, 2020

(54) REMOVABLE CIRCUIT FOR UNLOCKING SELF-ENCRYPTING DATA STORAGE DEVICES

(71) Applicant: Seagate Technology LLC, Cupertino, CA (US)

(72) Inventor: Christopher Nicholas Allo, Lyons, CO (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 362 days.

This patent is subject to a terminal disclaimer.

(21) Appl. No.: 15/667,547

(22) Filed: Aug. 2, 2017

(51) Int. Cl.
| | | |
|---|---|---|
| *H04L 29/06* | (2006.01) | |
| *H04L 9/08* | (2006.01) | |
| *G06F 21/62* | (2013.01) | |
| *G06F 21/78* | (2013.01) | |

(52) U.S. Cl.
CPC ........ *H04L 9/0822* (2013.01); *G06F 21/6218* (2013.01); *G06F 21/78* (2013.01); *H04L 9/083* (2013.01); *H04L 9/0894* (2013.01); *H04L 63/062* (2013.01); *H04L 2209/24* (2013.01); *H04L 2209/76* (2013.01)

(58) Field of Classification Search
CPC ... H04L 9/0822; H04L 63/062; H04L 9/0894; G06F 21/78; G06F 21/6218
See application file for complete search history.

(56) References Cited

U.S. PATENT DOCUMENTS

| | | |
|---|---|---|
| 6,950,523 B1 | 9/2005 | Brickell et al. |
| 7,752,463 B2 | 7/2010 | Hahn et al. |
| 7,877,603 B2 | 1/2011 | Goodman et al. |
| 7,953,978 B2 | 5/2011 | Greco et al. |
| 8,254,577 B2 | 8/2012 | Almoustafa et al. |
| 8,295,490 B1 * | 10/2012 | McCoy ................. H04L 9/0894 380/279 |
| 8,300,831 B2 | 10/2012 | Kahler et al. |
| 8,474,698 B1 | 7/2013 | Billett et al. |
| 8,494,170 B2 | 7/2013 | Kahler et al. |
| 8,995,654 B2 | 3/2015 | Tang et al. |
| 9,202,059 B2 | 12/2015 | Bhansali et al. |
| 9,756,033 B2 | 9/2017 | Isozaki |
| 2003/0041250 A1 * | 2/2003 | Proudler ................. G06F 21/57 713/182 |

(Continued)

OTHER PUBLICATIONS

Oasis. "Key Management Interoperability Protocol (KMIP)", May 2009. (Year: 2009).*

(Continued)

*Primary Examiner* — Roderick Tolentino
(74) *Attorney, Agent, or Firm* — Kirk A. Cesari

(57) ABSTRACT

Security of data storage devices and servers can be improved by the system and methods described herein. In some embodiments, a key management server may be locally or externally located. An encryption key may be used for locking a portion or the entirety of a storage device. The key management server may communicate with data storage devices regarding encryption keys using secure protocols. For example, the key management server may generate a communication key that may be used to securely encrypt messages between the server and a data storage device.

19 Claims, 12 Drawing Sheets

(56) References Cited

U.S. PATENT DOCUMENTS

| | | | |
|---|---|---|---|
| 2004/0146163 A1* | 7/2004 | Asokan | H04L 9/0866 380/277 |
| 2008/0022361 A1 | 1/2008 | Bharadwaj et al. | |
| 2008/0065903 A1* | 3/2008 | Goodman | G06F 21/6218 713/193 |
| 2008/0147892 A1* | 6/2008 | Carlson | G06F 13/385 710/5 |
| 2011/0258456 A1* | 10/2011 | Lyakhovitskiy | G06F 21/78 713/189 |
| 2011/0261964 A1* | 10/2011 | Kahler | H04L 9/0825 380/286 |
| 2012/0099728 A1* | 4/2012 | Rich | H04L 63/102 380/277 |
| 2012/0151199 A1 | 6/2012 | Shriver | |
| 2012/0239943 A1 | 9/2012 | Okamoto | |
| 2013/0024679 A1 | 1/2013 | Isozaki | |
| 2013/0067242 A1 | 3/2013 | Lyakhovitskiy et al. | |
| 2013/0232584 A1 | 9/2013 | Baentsch et al. | |
| 2014/0025947 A1 | 1/2014 | Jaber et al. | |
| 2014/0161251 A1 | 6/2014 | Yoshida et al. | |
| 2014/0237569 A1 | 8/2014 | Zhao et al. | |
| 2015/0006910 A1 | 1/2015 | Shapiro | |
| 2015/0121028 A1* | 4/2015 | Gupta | G06F 12/1466 711/164 |
| 2016/0117263 A1 | 4/2016 | Kanno et al. | |
| 2016/0191481 A1 | 6/2016 | Zimmer et al. | |
| 2016/0197962 A1* | 7/2016 | Winn | H04L 63/20 713/168 |
| 2017/0012770 A1* | 1/2017 | Lin | G06F 21/572 |
| 2017/0076096 A1 | 3/2017 | Challener et al. | |
| 2017/0083457 A1 | 3/2017 | Khemani et al. | |
| 2017/0085374 A1* | 3/2017 | Chen | H04L 9/0827 |
| 2017/0244698 A1* | 8/2017 | Gale | H04L 63/0853 |
| 2017/0264432 A1 | 9/2017 | Horowitz et al. | |
| 2018/0041483 A1 | 2/2018 | Smith et al. | |
| 2018/0205711 A1 | 7/2018 | Kumar et al. | |
| 2018/0295115 A1 | 10/2018 | Kumar et al. | |
| 2019/0068370 A1 | 2/2019 | Neerumalla | |

OTHER PUBLICATIONS

Griscioli et al., "Securing promiscuous use of untrusted USB thumb drives in Industrial Control Systems," 2016 14th Annual Conference on Privacy, Security and Trust (PST) Year: 2016 | Conference Paper | Publisher: IEEE.*

Reddy et al., "USB_SEC: A secure application to manage removable media," 2016 10th International Conference on Intelligent Systems and Control (ISCO) Year: 2016 | Conference Paper | Publisher: IEEE.*

Ouellet, Seagate Secure Self-Encrypting Drives with LSI MegaRAID SafeStore Encryption Services for Servers, Product Brief, LSI, San Jose, CA, 2013, 3 pages. file:///C:/Users/CR%20Docket/Downloads/LSI-PB-Seagate-SED-SafeStore.pdf.

Allo et al., "Removable Circuit for Unlocking Self-Encrypting Data Storage Devices", U.S. Appl. No. 15/214,965, filed Jul. 20, 2016, 39 pages.

Allo et al., "Removable Circuit for Unlocking Self-Encrypting Data Storage Devices", U.S. Appl. No. 14/862,128, filed Sep. 22, 2015, 38 pages.

Allo et al., "Systems and Methods for Unlocking Self-Encrypting Data Storage Devices", U.S. Appl. No. 15/436,712, filed Feb. 17, 2017, 45 pages.

Allo et al., "Self-Contained Key Management Device", U.S. Appl. No. 15/498,348, filed Apr. 26, 2017, 46 pages.

Bradley, "Centrally Managing Access for Self-Encrypting Drives in Lenovo Systen x Servers", Mar. 2015, 198 pages.

Oasis, Key Management Interoperability Protocol (KMIP), May 2009, 22 pages.

Opal, "TCG Storage Security Subsystem Class; Opal", Aug. 2015. 80 pages.

* cited by examiner

REMOVABLE CIRCUIT FOR UNLOCKING SELF-ENCRYPTING DATA STORAGE DEVICES

SUMMARY

In some embodiments, an apparatus can comprise a data storage device configured to connect to be removable from a first server. A key management system stored locally in the data storage device can be loaded into the memory of the first server, the key management system configured to transmit, from the first server to a second server, a request for an encrypted key corresponding to an encrypted data storage device ("DSD"), the request including an authentication certificate. The key management system also configured to retrieve a communication key corresponding to the DSD, receive the encrypted key from the second server, and unlock a secure storage area of the DSD with the encrypted key, the system configured to use the communication key to secure communication between the key management system and the other data storage device while performing the unlock of the secure storage area of the other data storage device.

In some embodiments, a system can include a data storage device configured to be connectable and removable from a first server. The data storage device can include: an interface circuit, a secure nonvolatile data storage area, a memory storing a key management system, and a controller. The controller can be configured to load the key management system into the memory of the first server. The key management system can be configured to: access a hardware encryption circuit of the first server; obtain access to the secure nonvolatile data storage area of the data storage device via the hardware encryption circuit, retrieve an authentication certificate from the secure nonvolatile data storage area when access is granted to the key management system, transmit, from the first server to a second server, a request for a key corresponding to an encrypted data storage device ("DSD") connected to the first server where the request includes the authentication certificate, retrieve a communication key corresponding to the encrypted DSD from the secure nonvolatile data storage, receive the key from the second server, and unlock the encrypted DSD with the key, the key management system configured to use the communication key to secure communication between the key management system and the encrypted DSD while performing the unlock of the encrypted DSD.

In some embodiments, a memory device can store instructions that when executed cause a processor to perform a method. The method may include: accessing a hardware encryption circuit of a first server; obtaining access to a secure nonvolatile data storage area of a first data storage device via the hardware encryption circuit; retrieving an authentication certificate from the secure nonvolatile data storage area when access is granted; transmitting, from the first server to a second server, a request for a key corresponding to a second data storage device connected to the first server, the request including the authentication certificate; retrieve a communication key from the secure nonvolatile data storage area; receiving the key from the second server; and unlocking, via the key and using the communication key to secure communication, the second data storage device with the key.

DETAILED DESCRIPTION

In the following detailed description of the embodiments, reference is made to the accompanying drawings which form a part hereof, and in which are shown by way of illustrations. Features of the various described embodiments may be combined, other embodiments may be utilized, and structural changes may be made without departing from the scope of the present disclosure. Features of the various embodiments and examples described herein may be combined, exchanged, removed, other embodiments utilized, and structural changes made without departing from the scope of the present disclosure.

The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

In accordance with various embodiments, the methods and functions described herein may be implemented as one or more software programs running on a computer processor or controller. In accordance with various embodiments, the methods and functions described herein may be implemented as one or more software programs running on a computing device, such as a server, a data storage device (e.g. a solid state drive, a hard drive, a hybrid drive), or a combination thereof. Dedicated hardware implementations including, but not limited to, application specific integrated circuits, programmable logic arrays, and other hardware devices can likewise be constructed to implement the methods and functions described herein. Further, the methods and functions described herein may be implemented as a device, such as a computer readable storage medium or memory device, including instructions that when executed cause a processor to perform the methods.

Figure 1:
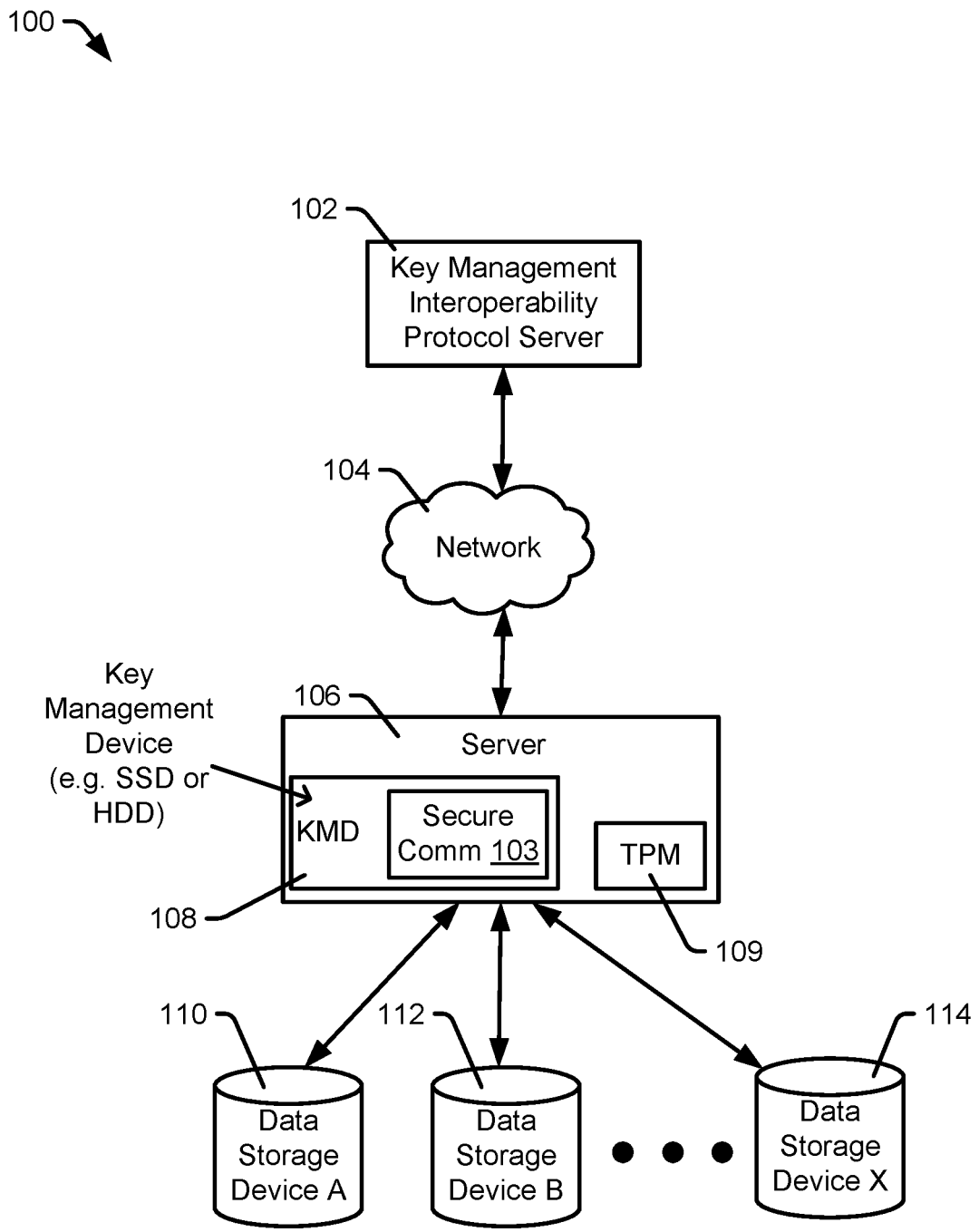
FIG. 1 is a diagram of a system of a removable circuit for unlocking self-encrypting data storage devices, in accordance with certain embodiments of the present disclosure.

Referring to FIG. 1, certain embodiments of a system of a removable circuit for unlocking self-encrypting data storage devices are shown and generally designated 100. System 100 can include a key management interoperability protocol ("KMIP") server 102 coupled to a server 106 via a network 104, which may be a wired or wireless network and may be any type of network. The server 106 may be a data server, file system server, metadata server, web server, application server, network attached storage (NAS), or other server. In some embodiments, the server 106 may include a redundant array of independent discs ("RAID") server. The server 106 may include a key management device ("KMD") 108 that may include a secure communication module 103, and may be coupled to one or more data storage devices ("DSDs"), such as DSDs A 110, B 112, and X 114. Further, the server 106 may include a trusted platform module ("TPM") 109 that can implement security protocols. The TPM 109 may be implemented as software, hardware, or a combination thereof such as security controller implementing firmware. In some embodiments, the TPM 109 may be a secure cryptographic integrated circuit ("IC") that is configured to manage user authentication, network access, data protection, or a combination thereof.

The DSDs A 110, B 112, and X 114, may be self-encrypting drives ("SEDs") and can be a solid-state drive ("SSD"), a hard disc drive ("HDD"), a hybrid drive, or a combination thereof. SEDs may encrypt data by itself, such as before data is stored to a storage medium (e.g. magnetic discs or flash memory) and decrypt the data as the data is retrieved from the storage medium. An SED may encrypt data with an internally stored encryption key that is not accessible outside of the SED, and may further decrypt encrypted data with a corresponding decryption key. In some examples, an SED's encryption key may be a symmetric key used by an SED's encryption engine to encrypt plaintext (i.e. data in transit) into cipher text (i.e. encrypted data) when the data is stored to the SEDs and to decrypt cipher text into plain text when data is read from the SEDs.

An SED may be said to be unlocked when a correct symmetric key (or other key combinations) has been provided, thus allowing the encrypted data to be decrypted. An SED may be said to be locked when the data remains encrypted and a correct symmetric key (or other key combinations) has not been provided. In some cases, an SED can become locked when power is removed to prevent an unauthorized person from taking the SED and accessing the data. In order to gain access to the encrypted data when power is restored, a correct access key must be provided to the SED. In some embodiments, the access key(s) may be encrypted and stored remotely on the KMIP server 102.

In addition, the SED may be configured to securely perform communications related to the locking and unlocking of the SED. For example, the secure communication may be performed using pre-shared key(s) or a public/private key infrastructure using digital certificate(s) when communicating the symmetric keys (or other key combinations).

In some embodiments, the KMD 108 may be a removable storage device, such as a HDD, SSD, or hybrid drive, which may also be an SED. The KMD may store a key management system in a non-secure data storage area of the KMD that can be loaded into the server memory for execution of the security protocols to unlock, register, or perform other functions on any SEDs connected to the server, or in communication with, the server. Depending on the implementation, the specifics of the key management system may vary. For example, in some examples, the key management system may be an operating system which may be loaded during boot prior to the loading of the native operating system of the server 106. Examples of such embodiments are discussed below with regard to FIGS. 2 and 6 8. In other examples, the key management system may be a Basic Input Output System (BIOS) such as a UEFI BIOS. Examples of such embodiments are discussed below with regard to FIGS. 3 and 9-11. Of course, difference between these examples types, other than where necessitated by the difference between the disclosed OS and UEFI BIOS, may be applied interchangeably.

The KMD 108 may include a secure storage area configured or reserved to store unique identification keys for each of the DSDs A 110, B 112, and X 114. The server 106 may provide secure access to the reserved storage area of the KMD 108 via utilizing the security protocols of the TPM 109. For example, the KMD 108 may not be able to access data (e.g. the KMIP authentication keys) in the secure reserved storage area until the TPM 109 provides the proper access key to the KMD 108.

Once the KMD 108 has access to the reserved storage area, the KMD 108 (e.g. via the server 106) may transmit a request to the KMIP server 102 for encrypted keys corresponding to DSDs A 110, B 112, and X 114 or corresponding to bands thereof. The request may include certificates (e.g. KMIP authentication keys), retrieved from the reserved storage area, that uniquely identify the drive(s) or band(s) that the server 106 wants to unlock. The KMIP server 102 can then reply with the corresponding encrypted keys. The KMD 108 may also retrieve, from the reserved storage area, communication keys corresponding to DSDs A 110, B 112, and X 114 for use in secure communication with the DSD(s). Once the KMD 108 receives the encrypted key(s) and communication key(s), it may communicate with and unlock the DSDs A 110, B 112, and X 114 using the retrieved keys. In some examples, once DSD A is unlocked, thus giving the server 106 access to data in DSD A, the KMD 108 may delete the locally stored version of the encrypted key and communication key used to unlock DSD A.

In some examples, the KMD 108 may determine if there are any unregistered SEDs coupled to the server 106. Unregistered SEDs may be SEDs for which no encrypted key is stored in the KMIP server 102. For example, if another DSD is coupled to the server 106, that DSD may be said to be unregistered if the KMIP server 102 does not already have an encrypted key associated with the newly coupled DSD. To register unregistered DSDs, the KMD 108 may obtain a unique identifier for the unregistered DSDs, and provide the unique identifier and a request for a security identification ("ID") corresponding to the unique identifier to the KMIP server 102 and the secure communication module 103. The KMIP server 102 can create the security ID and a corresponding encrypted key. The encrypted key can be stored on the KMIP server 102, and the KMIP server 102 may provide the security ID and the encrypted key to the KMD 108. The KMD 108 can lock the SED with the encrypted key. The security ID may be stored to the secure storage area of the KMD 108, which the security ID may be part of a certificate (e.g. authentication key) that includes the security ID, and the storage area be secured by the TPM 109. The KMD 108 may then delete the local version of the encrypted key that was used to lock the corresponding SED. Similarly, the secure communication module 103 can create a unique communication ID and a corresponding communication key to be associated with the unregistered DSD. The communication key can be stored on the secure communication module 103, and the secure communication module 103 may provide the communication ID and the communication key to the KMD 108 upon request. The KMD 108 can provide the communication key to the unregistered SED and configure or instruct the SED to utilize the communication key when performing communications related to unlocking the SED. The communication ID may be stored to the first secure storage area of the KMD 108, which the communication ID may be part of a certificate (e.g. authentication key) that includes the communication ID, and the first storage area can be secured by the TPM 109. The KMD 108 may then delete the local version of the communication key that was used to lock the corresponding SED. From that point on, the SED may be unlocked by communicating with the SED using the communication key stored in the communication module 103 and with the encrypted key stored in the KMIP 102, via the processes described herein. As mentioned above, the communication key may, for example, be a pre-shared key, a public key that is part of a certificate or similar types of keys. In some examples, a certificate may be a digital document that may include a cryptographic key, issuing authority, server name and client name, and other information. In some examples in which a public-private key infrastructure is utilized, the KMD 108 or secure communication module 103 may further provide a public key or certificate of the KMD 108 to the SED during registration.

In some embodiments, the KMD 108 may connect to be removable from the server 106 by physically and electrically connecting and disconnecting the KMD 108 to the server 106 without physically modifying the server 106. For example, the KMD 108 may be a data storage device that can connect via an interface to the server's 106 motherboard without physically modifying (e.g. moving, partially or wholly disassembling, disconnecting, etc.) components (e.g. mother board, graphics cards, processors, memory modules, expansion boards, DSDs, network adapters, power connectors, etc.) in the server 106. For example, to install the KMD 108 in the server 106, a user can simply select an available data storage device interface connection in a motherboard, attach a cable (if needed) with the connectors to the KMD 108 and to the motherboard. In some cases, connecting and disconnecting the KMD 108 in this manner can be accomplished without physically modifying the server 106. In some examples, the KMD 108 may be connected to other circuits in the server, such as an expansion card or memory bus. In some examples, the KMD may connect to be removable from the server 106 via intelligent drive electronics ("IDE"), serial advanced technology attachment ("SATA"), or another interface (e.g. SAS, NVMe, PCIe). Further, the KMD 108 may be removed from a server and connected to another server with little to no modification. The KMD 108 may be connected or disconnected from the server 106 when the server 106 is powered off or while the server 106 is still powered on.

In some examples, the KMD 108 may be located outside of the server's 106 physical enclosure, and may be physically connected and disconnected from the server 106 via an external interface without physically modifying the server 106. For example, the KMD 108 can connect to be removable from the server 106 via a serial bus, such as IEEE 1394, or another interface. In some embodiments, the KMD 108 can be a memory device that can connect to the server 106 via a USB interface, external serial advanced technology attachment ("eSATA"), or other interface. When the KMD 108 is connected to the server 106 via an external interface, the user can physically insert the KMD 108 into the appropriate interface directly or with interface cables. The KMD 108 may receive power from the server 106, or may be powered with a separate power supply. To remove the KMD 108 from the server 106, a user may physically remove the KMD 108 from the corresponding interface in the server 106. The user can reconnect the KMD 108 to the server 106 or optionally connect the KMD 108 to another server.

In some embodiments, the KMD 108 may include an interface which may be used to connect the KMD 108 to a SED without communications passing through the server or over a network (e.g. via intelligent drive electronics ("IDE"), serial advanced technology attachment ("SATA"), or another interface (e.g. SAS, NVMe, PCIe)). In some examples, the KMD 108 to SED interface may be utilized during registration of the SED with the KMD 108 as discussed above.

Figure 2:
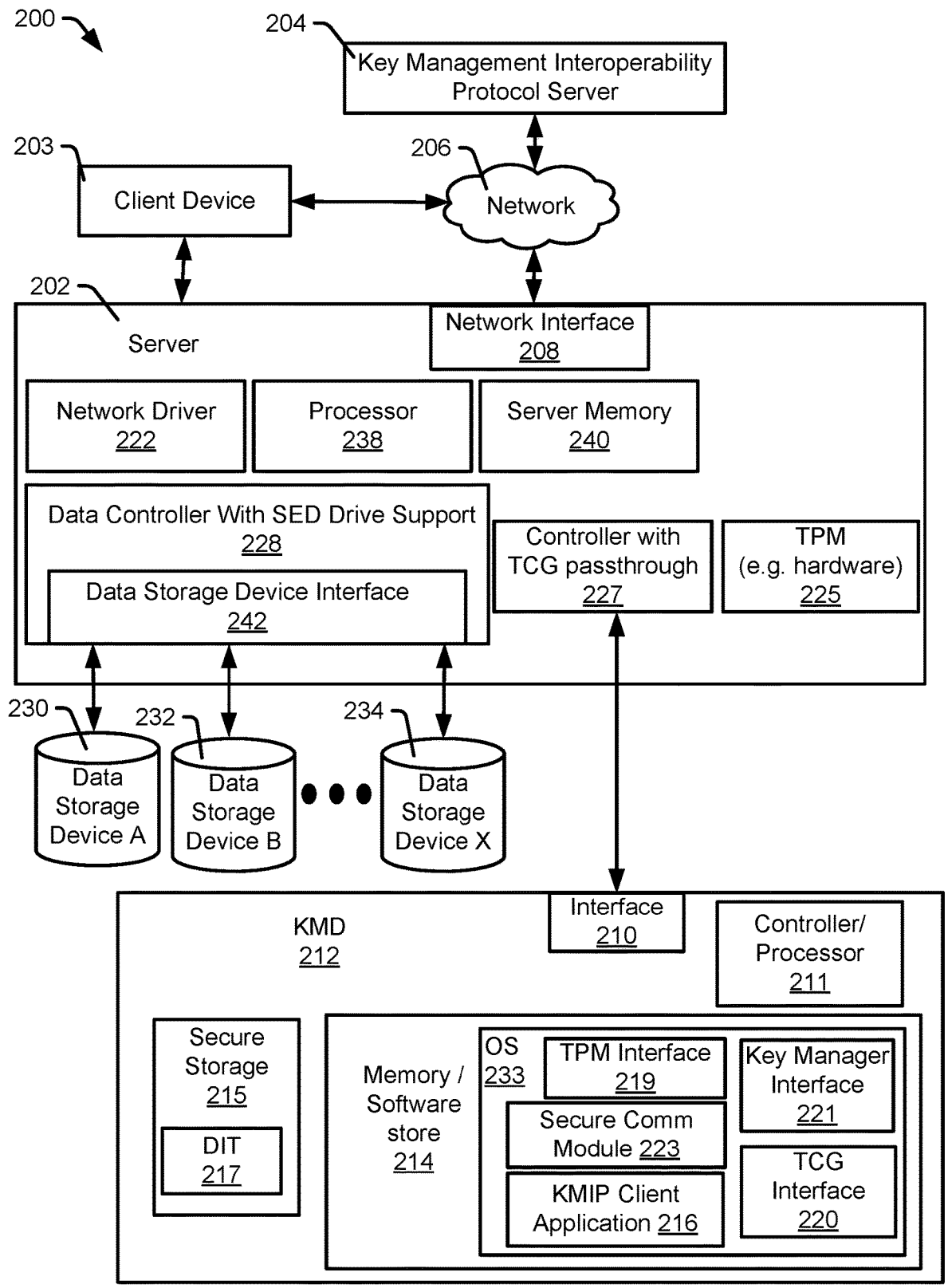
FIG. 2 is a diagram of a system of a removable circuit for unlocking self-encrypting data storage devices, in accordance with certain embodiments of the present disclosure.

Referring to FIG. 2, certain embodiments of a system of a removable circuit for unlocking self-encrypting data storage devices are shown and generally designated 200. The system 200 may be an example of the system 100, according to certain embodiments. The system 200 may have a KMIP 204 communicatively coupled to a server 202 via the network 206 and the network interface 208.

The server 202 may be coupled to DSD A 230, DSD B 232, and DSD X 234 via data controller 228. In some examples, DSDs A 230, B 232, and X 234 may be SEDs, and may be coupled to the data controller 228 via a DSD interface 242. The DSD interface 242 may be a serial-advanced-technology interface ("SATA"), serial-attached small-computer-system-interface ("SAS"), or other interface. The controller 228 may be a redundant array of independent discs ("RAID") controller or other data storage controller.

The server 202 can also include a server memory 240, network driver 222, processor 238, TPM 225, and a controller 227. In some examples, the processor 238 may be a circuit including one or more processing devices, such as central processing units, microprocessors, or other processors. The controller 227 may be a controller with a trusted computing group ("TCG") standardized passthrough protocols to allow the controller 227 to securely communicate with the KMD 212. In some examples, controller 227 and controller 228 may be combined into a single physical controller device.

The KMD 212 may be a removable data storage device, such as a hard disc drive (HDD) or solid state drive (SDD), connected to the server 202. The KMD 212 may include a non-secure data storage area 214 and a secure data storage area 215, both of which may be non-volatile memory, where secure data storage area 215 can be accessed via the TPM 225. The non-secure data storage area 214 may store an operating system ("OS") 233 that can be loaded into the server memory 240 for execution of the security protocols to unlock, register, or perform other functions on any SEDs connected to the server, or in communication with, the server 202. The OS 233 can be loaded into the memory 240 via the controller 211 providing the OS 233 to the controller 227 for loading into the memory 240.

The secure data storage area 215 can include a drive information table ("DIT") which can store information regarding SEDs managed by the security protocols of the server 202. The secure storage area 215 may be a reserved band or zone of the KMD 212 reserved to store authentication keys, communication keys, and other information corresponding to SEDs connected to the server 202. The secure storage area 215 may be encrypted and may only be accessible by the KMD 212 when the proper key is provided to the KMD 212 by the TPM 225.

Further, OS 233 can include code to implement security protocols or related functions, such as a key manager interface 221, a TCG interface 220, a KMIP client application 216, a TPM interface 219 and a secure communication module 223. The TPM interface 219 can allow the OS 233 to communicate with the TPM 225, which can allow the OS 233 to unlock the secure storage area 215. The key manager interface 221 can allow the OS 233 to communicate with the KMIP server 204. The TCG interface 220 can allow the OS 233 to communicate with the KMD 212. The KMIP client application 216 can allow the OS 233 to communicate with a user of the server 202, a client device 203, or another server. The secure communication module 223 may allow the OS 233 to communicate with the DSD A 230, DSD B 232, and DSD X 234 securely using the communication keys corresponding to the DSDs and stored in the secure storage 215.

During operation, the server 202 may be powered on, and the BIOS of the server 202 can be configured to load the operating system 233 from the KMD 212 into the server memory 240 for execution by the processor 238. The operating system 233 can be loaded prior to a native operating system of the server 202 being loaded. Once the OS 233 is finished running its security protocols, such as to unlock or modify security of a band(s) or drive(s), the BIOS may load the native operating system which allows the server 202 to perform its normal functions. The BIOS code and the native operating system code may be stored in a non-volatile memory of the server 202.

Once the OS 233 is loaded into the server memory, the OS code can be executed to connect to the TPM to unlock the secure storage area 215 of the KMD 212. Access to the secure storage area 215 can be gained by utilizing the TPM 225 to generate an access key to unlock the secure storage area 225. Once access to the secure storage area 215 is granted by the TPM 225, the OS 233 may retrieve the DIT 217 and any unique certificates identifying the SEDs connected to the server 202. In some examples, the DIT 217 can include a list of DSDs connected (physically or communicatively) to the server 202 and can include a registration status (e.g. registered or unregistered) of each DSD, communication keys for use with the DSDs, or other information corresponding to the DSD. Further, the DIT 217 can include a list of protected bands (e.g. zones) on one or more DSDs; and the functions herein can be performed per drive or per band. A protected band may be a reserved portion of the available storage in a DSD. Each DSD may have one or multiple bands for data storage. When referring to security locking or unlocking of SED DSDs herein, a band may be utilized instead of the whole drive.

Once the OS 233 has the DIT 217, the OS 233 can determine if any other drives or bands need to be added to the DIT 217. The OS 233 can also request an encrypted key from the KMIP server 204 to access the drives 230-234 or the bands listed in the DIT 217. The request to access the drives 230-234 or bands can include sending a unique certificate to the KMIP server 204 that corresponds to a specific item listed in the DIT 217; in response to a correct unique certificate arriving at the KMIP server 204, the KMIP server 204 can send a corresponding unique encrypted key back to the server 202. The OS 233 can then receive the encrypted key and communication key corresponding to a drive or band. The OS 233 may then utilize the secure communication module 223 to communicate with the corresponding drive using the communication key and unlock the corresponding drive or band utilizing the encrypted key. The OS 233 can then delete the local version of the communication key and the encrypted key used. Once all the drives are unlocked, the OS 233 may relock the secure storage 215 via the TPM 225 and then hand over control of the server 202 to the BIOS to implement the native operating system.

In some embodiments, whenever an SED is connected or disconnected from the server 202, one or more unique indicators corresponding to the SED may be added or removed from the DIT 217. In some examples, the unique indicators may be manually added or removed from the list by a user, or may be automatically added or removed without any interaction with a user, or a combination thereof may be performed.

In some embodiments, the KMIP server 204 and the server 202 may be communicatively coupled using a cryptographic protocol, such as a secure sockets layer ("SSL") or transport layer security ("TLS"), which use certificates to provide security. A certificate may be a digital document that may include an encrypted key, issuing authority, server name and client name, and other information.

When one or more of the DSDs A 230, B 232, and X 234 have not been unlocked, the OS 233 may create an error indicator. In some cases, the OS 233 may create the error indicator when a threshold amount of time has passed since an encrypted key has been sent to a DSD, if an unlocked status indicator has not been received. The error indicator can be stored to a log file and can indicate which of the DSDs were not unlocked. The log file may be stored in the memory 214, server memory 240, secure storage 215, other memory, or any combination thereof.

In some examples, the KMD 212 can include one or more commands stored within the KMD 212 that can be loaded into the memory of the server 202 and run executed by the server 202; the commands could include commands to allow a user to add a drive or band or remove a drive or band from the. When a command of the KMD 212 is to be executed, the DIT 217 may be retrieved and compared to the actual physical configuration of the system 202, or any other system the KMD 212 manages, to verify the components of the system. The DIT 217 can be updated based on any changes to the system 202, or an error may be registered if any components cannot be verified. For example, the system can check for drive serial numbers, unique identifiers, encryption keys, or other information to detect if drives are in a different location or have been removed. In some cases, after OS 233 is closed after the KMD 212 setup is finished, the KMD 212 commands can be available to be executed via the server 202 while the server 202 is running the normal OS.

Figure 3:
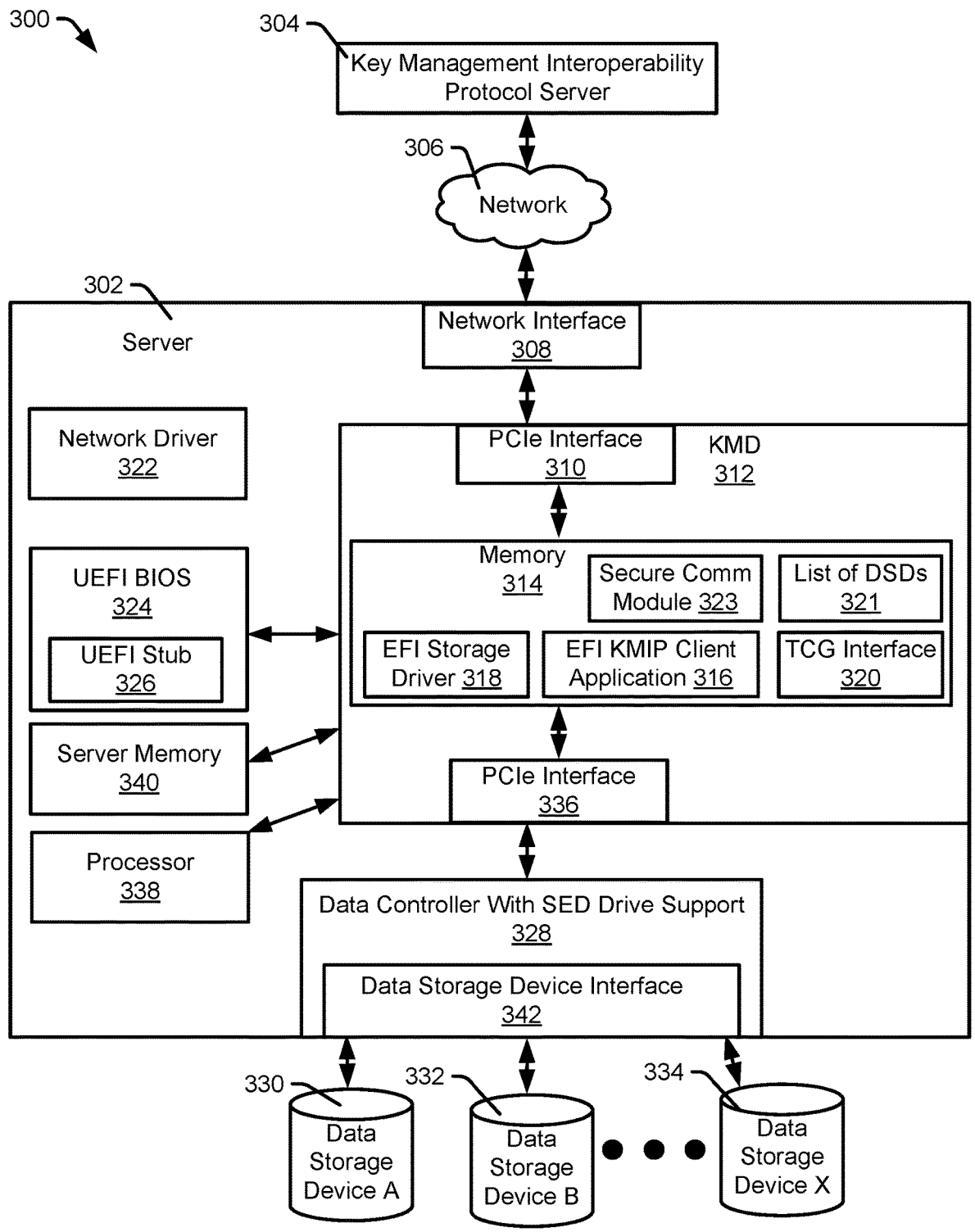
FIG. 3 is a diagram of a system of a removable circuit for unlocking self-encrypting data storage devices, in accordance with certain embodiments of the present disclosure.

Referring to FIG. 3, certain embodiments of a system of a removable circuit for unlocking self-encrypting data storage devices are shown and generally designated 300. The system 300 may be an example of the system 100, according to certain embodiments. The system 300 may have a KMIP 304 communicatively coupled to a server 302 via the network 306 and the network interface 308.

The server 302 may be coupled to DSD A 330, DSD B 332, and DSD X 334 via data controller 328. In some examples, DSDs A 330, B 332, and X 334 may be SEDs, and may be coupled to the data controller 328 via a DSD interface 342. The DSD interface 342 may be a serial-advanced-technology interface ("SATA"), serial-attached small-computer-system-interface ("SAS"), or other interface. The controller 328 may be a redundant array of independent discs ("RAID") controller or other data storage controller.

The server 302 can include a server memory 340, network driver 322, processor 338, and unified extensible firmware interface ("UEFI") basic input/output system ("BIOS") 324. In some examples, the processor 338 may be a circuit including one or more processing devices, such as central processing units, microprocessors, or other processors. The UEFI BIOS 324 can include a UEFI stub 326, and may be coupled to a KMD 312. In some examples, the UEFI stub 326 may include instructions to call functions and load programs in the KMD 312 into the server memory 340. In some embodiments, the UEFI stub 326 may be created by a designer or manufacturer of the KMD 312 or its components, and stored in the memory 314. When the KMD 312 is first installed in the server 302, a program or application may install the UEFI stub 326 to an area of the server 302 that complies with UEFI storage standards. In some embodiments, the program or application that may install the UEFI stub 326 in the server 302 may also load information stored in the EFI storage driver 318, EFI KMIP client application 316, and trusted computing group ("TCG") interface 320 into server memory 340.

The KMD 312 may be a PCIe device attached to the server 302. The KMD 312 may communicate with the network 308 via PCIe interface 310, and may communicate with the controller 328 via PCIe interface 336. In some embodiments, the PCIe interface 310 may be the PCIe interface 336.

The KMD 312 may include a memory 314. The memory 314 may include a list of DSDs 321. The list of DSDs 321 can include a list of DSDs attached to the server 302. For example, the list of DSDs 321 can include unique identifiers and communication keys corresponding to DSDs A 330, B 332, and X 334. In some examples, the list of DSDs 321 can include a registration status (e.g. registered or unregistered), communication keys, or other information corresponding to DSDs A 330, B 332, and X 334. In some embodiments, the list of DSDs 321 may be stored in a secure data storage area. For example, the secure storage area may be a reserved band or zone of the KMD 312 reserved to store the unique identifiers and communication keys of the list of DSDs 321 and other information corresponding to SEDs connected to the server 302. The secure storage area may be encrypted and may only be accessible by the KMD 312 when the proper key is provided to the KMD 212 by a TPM.

Further, the KMD 312 may include software modules, such as extensible firmware interface ("EFI") storage driver 318, EFI KMIP client application 316, and TCG interface 320. In some embodiments, a module may be set of executable instructions stored in a memory that may be processed by a processor to cause the processor to perform certain tasks. The secure communication module 323 may allow the UEFI BIOS module 324 or UEFI stub 326 to communicate with the DSD A 330, DSD B 332, and DSD X 334 securely using the communication keys corresponding to the DSDs and stored in the list of DSDs 321.

During operation, the server 302 may be powered on, and instructions in the UEFI BIOS 324 may be processed. In some embodiments, the UEFI BIOS 324 may be processed by the processor 338 or other processor. In some examples, the instructions in the UEFI BIOS 324 can include initializing the processor 338, determining if any PCIe devices are coupled to a PCIe interface, checking the server memory 340 for errors, performing system diagnostics, other operations, or any combination thereof. Further, the instructions in the UEFI BIOS 324 may be processed to load the network driver 322 into the server memory 340, thus providing access to the network interface 308.

Further, the UEFI BIOS 324 may be processed to determine if the UEFI stub 326 is present. When the UEFI stub 326 is present, instructions (e.g. function calls) in the UEFI stub 326 may be processed by the processor 338 to execute instructions in the memory 314. For example, the UEFI stub 326 may instruct the processor 338 to load the EFI storage driver 318 into the server memory 340. The EFI storage driver 318 may persist in the server memory 340 until the server 302 is rebooted or powered down.

Once the EFI storage driver 318 is loaded into the server memory 340, the processor 338 may be able to access data and process instructions in the memory 314. For example, the processor 338 may process instructions in the EFI KMIP client application 316 to determine if there are any SEDs coupled to the server 302. A request may be sent to the DSDs A 330, B 332, and X 334 requesting an encryption status indicator to determine if they are SEDs. For example, the processor 338 may process information in the TCG interface 320 to determine if the DSDs A 330, B 332, and X 334 are SEDs.

In some embodiments, a list of SEDs may be stored in the memory 314. Whenever an SED is connected or disconnected from the server 302, a unique indicator corresponding to the SED may be added or removed from the list. In some examples, the unique indicators may be manually added or removed from the list by a user. In some embodiments, the EFI KMIP client application 316 may determine the unique identifiers of attached SEDs to create a list of SEDs, or to update an existing list of SEDs.

Once the unique identifiers have been determined, the EFI KMIP client application 316 can transmit a request for encryption keys corresponding to the unique identifiers to the KMIP server 304. In some embodiments, the KMIP server 304 and the KMD 312 may be communicatively coupled using a cryptographic protocol, such as a secure sockets layer ("SSL") or transport layer security ("TLS"). SSL and TLS use certificates to provide security. A certificate may be a digital document that may include an encryption key, issuing authority, server name and client name, and other information. The EFI KMIP client application 316 may get the certificates from the EFI storage 318. The EFI storage driver 318 can determine information about the server 302 (e.g. server name, address), information about the KMIP server 304 (e.g. server name, address), and can get the certificates from the issuing authority.

The EFI KMIP client application 316 can receive the encryption keys from the KMIP server 304 and retrieve the communication keys corresponding to drives. The EFI KMIP client application 316 may then communicate with the corresponding drive using the communication key and provide the encryption keys to the DSDs A 330, B 332, and X 334 to unlock the DSDs A 330, B 332, and X 334. In some embodiments, the EFI KMIP client application 316 may unlock the DSDs A 330, B 332, and X 334 using TCG protocols. For example, in systems using TCG protocols, encryption hardware may be included in the controller 328 as well as in the DSDs A 330, B 332, and X 334, which may allow the DSDs A 330, B 332, and X 334 to operate at a full data rate without performance degradation.

The EFI KMIP client application 316 may call TCG libraries from the TCG interface 320. The TCG libraries can contain commands to unlock the DSDs A 330, B 332, and X 334. In some cases, a command to unlock the DSDs A 330, B 332, and X 334 may be provided with the encryption keys.

Once the encryption keys and the commands to unlock have been provided to the DSDs A 330, B 332, and X 334, the EFI KMIP client application 316 may determine if the DSDs A 330, B 332, and X 334 have been unlocked. In some examples, the DSDs A 330, B 332, and X 334 may automatically send a lock/unlock status indicator to the EFI KMIP client application 316 to indicate if the unlock operation was successful. In some cases, the TCG interface 336 may send a command to the DSDs A 330, B 332, and X 334 requesting a response indicating whether the unlock operation was a success or a failure. In some examples, the EFI KMIP client application 316 may transmit a query to the DSDs A 330, B 332, and X 334 to request the status indicator. The DSDs A 330, B 332, and X 334 may send a message to the EFI KMIP client application 316 indicating whether they have been unlocked. When one or more of the DSDs A 330, B 332, and X 334 have not been unlocked, the EFI KMP client application 316 may create an error indicator. In some cases, the EFI KMP client application 316 may create the error indicator when a threshold amount of time has passed since the EFI KMIP client application 316 sent the encryption keys to the DSDs A 330, B 332, and X 334, if the status indicator has not been received. The error indicator can indicate which of the DSDs were not unlocked. In some embodiments, the EFI KMIP client application 316 may store the error to a log file. The log file may be stored in the memory 314, server memory 340, other memory, or any combination thereof.

Figure 4:
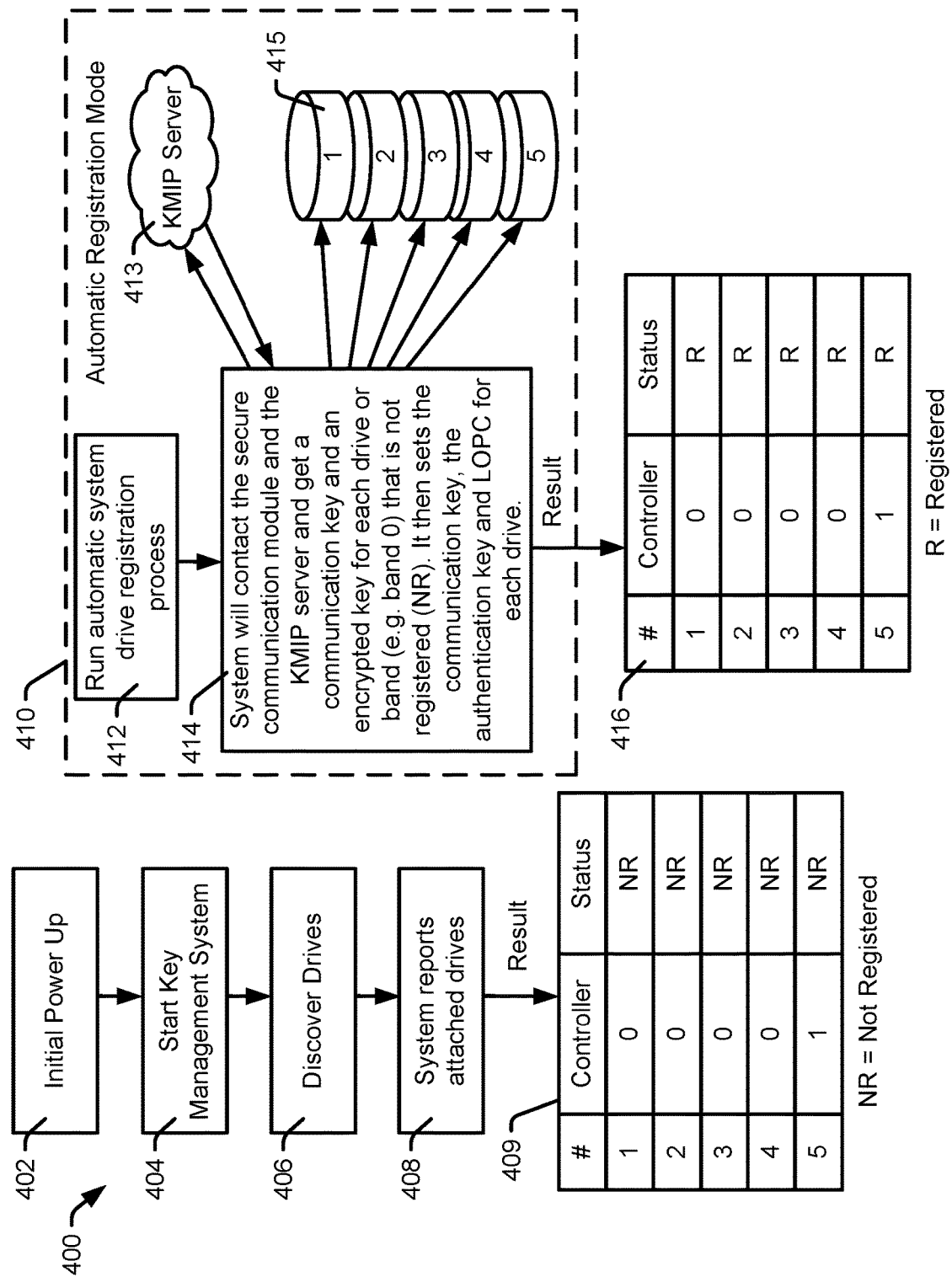
FIG. 4 is a flowchart of a method for unlocking self-encrypting data storage devices with a removable circuit, in accordance with certain embodiments of the present disclosure.

Referring to FIG. 4, certain embodiments of a method for unlocking self-encrypting data storage devices with a removable device are shown and generally designated 400. The method 400 may be implemented by the systems 100, 200 and 300, according to certain embodiments. Generally, the method 400 is a general overview of how systems, such as systems 100, 200 and 300, can register DSDs 415, or bands thereof, with a KMIP server 413.

The method 400 may start when a server is initially powered on, at 402. The server may load the key management system (e.g. an operating system or a UEFI Bios and UEFI shell) from the KMD to the server, at 404, and discover any SEDs or DSDs connected to the server, at 406. The key management system may report the connected drives to the KMD, at 408. The KMD may store or update the results of the reported drives in a drive information table ("DIT") 409 that may indicate whether the connected drives are registered or not registered. In UEFI BIOS examples according to FIG. 3, the DIT may correspond to the list of drives of FIG. 3. The DIT and updates to the DIT may be stored or updated to a secure area of the memory. The DIT 409 may also store other information, such as communication keys for registered drives or an indication of which server data storage controller a drive is associated with. If needed, the system can create the DIT 409 if one does not exist. The DIT may be an internal table stored within the KMD that is accessed by the key management system using security protocols as discussed herein.

If there are unregistered drives or bands, the server may implement an automatic registration mode, at 410, to perform an automatic drive registration process, at 412. The automatic registration mode may include the server system contacting the secure communication module and the KMIP server 413 to receive a communication key and an encrypted key for each drive or band in the DIT 409 that is not registered, at 414. The automatic registration mode may then install the corresponding communication key, authentication key and lock-on-power-cycle ("LOPC") setting(s) to each drive, at 414. The result of the automatic registration mode can be stored in DIT 409.

A LOPC setting can be a setting within each separate physical drive that indicates a drive is to be locked when a power cycle event occurs, such that once power is restored the drive is locked. The LOPC setting can be done per whole drive, per protected band/zone, or another configuration. Further, the unlocking processes discussed herein may be utilized for a per band unlocking process, where there can be multiple bands per drive. In addition, though the communication keys are described above as being per drive, in some embodiments, the communication keys may be per drive, per band, or a mix thereof.

Figure 5:
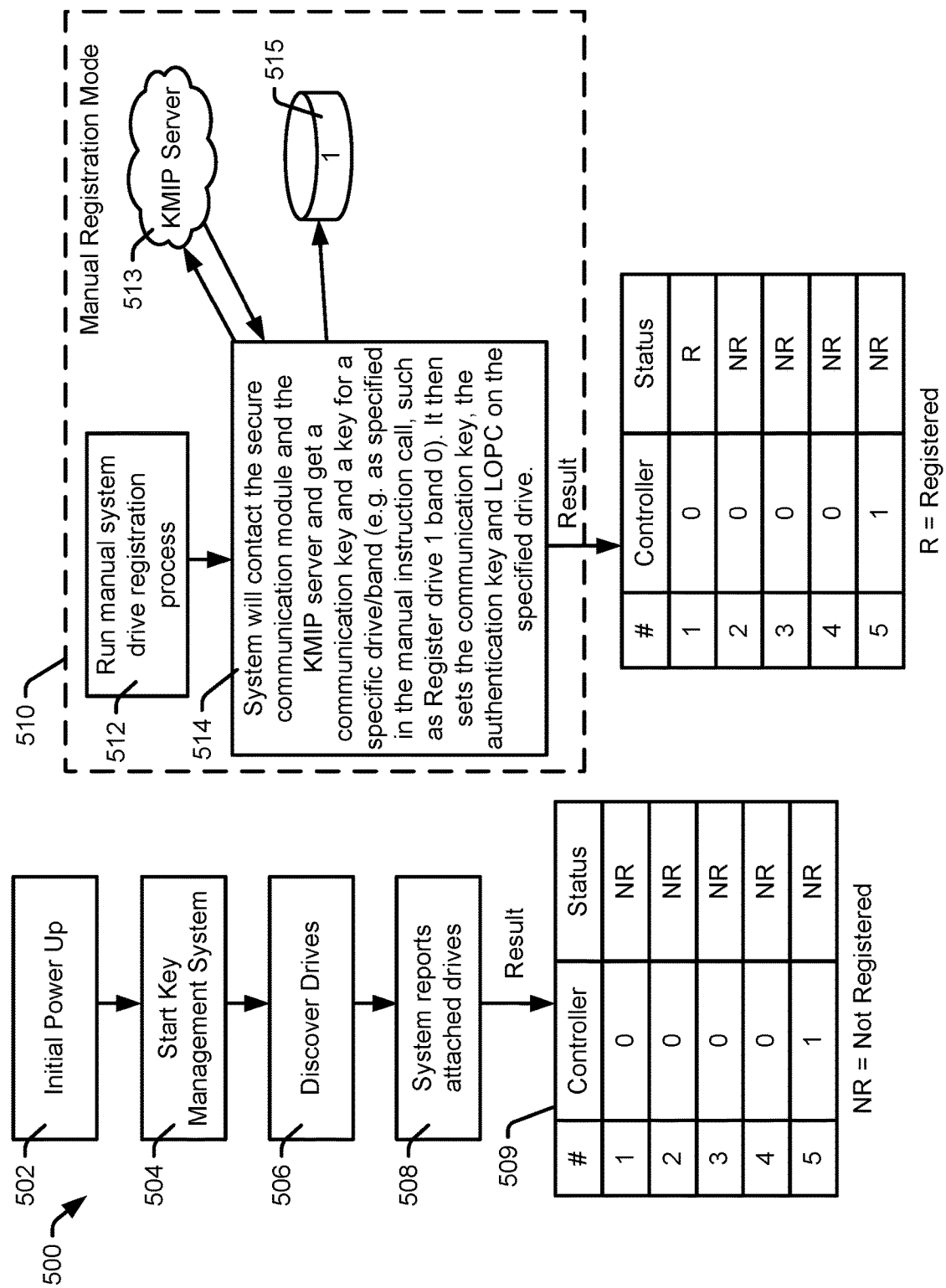
FIG. 5 is a flowchart of a method for unlocking self-encrypting data storage devices with a removable circuit, in accordance with certain embodiments of the present disclosure.

Referring to FIG. 5, certain embodiments of a method for unlocking self-encrypting data storage devices with a removable device are shown and generally designated 500. The method 500 may be implemented by the systems 100, 200 and 300, according to certain embodiments. Generally, the method 500 is a general overview of how systems, such as systems 100, 200 and 300, can register one or more DSDs 515, or bands, with a KMIP server 513.

The method 500 may start when a server is initially powered on, at 502. The server may load the key management system (e.g. an operating system or a UEFI Bios and UEFI shell) from the KMD to the server, at 504, and discover any SEDs or DSDs connected to the server, at 506. The key management system may report the connected drives to the KMD, at 508. The KMD may store or update the results of the reported drives in a drive information table ("DIT") 509 that may indicate whether the connected drives, or bands thereof, are registered or not registered. In UEFI BIOS examples according to FIG. 3, the DIT may correspond to the list of drives of FIG. 3. The DIT and updates to the DIT may be stored or updated to a secure area of the memory. The DIT 509 may also store other information, such as communication keys for registered drives or an indication of which server data storage controller a drive is associated with. If needed, the system can create the DIT 509 if one does not exist.

If there are unregistered drives or bands, the server may implement a manual registration mode, at 510, to perform a manual drive registration process, at 512. The manual registration mode may be initiated by a user or client of the server indicating a specific unregistered DSD or band in the DIT 509 should be registered. The server system can then contact the secure communication module and the KMIP server 513 to receive a communication key and an encrypted key for the indicated drive or band, at 514. The manual registration mode may then install the corresponding communication key, authentication key and lock-on-power-cycle ("LOPC") setting(s) to the specific drive or band, at 514. The result of the manual registration mode can be stored in DIT 509.

Figure 6:
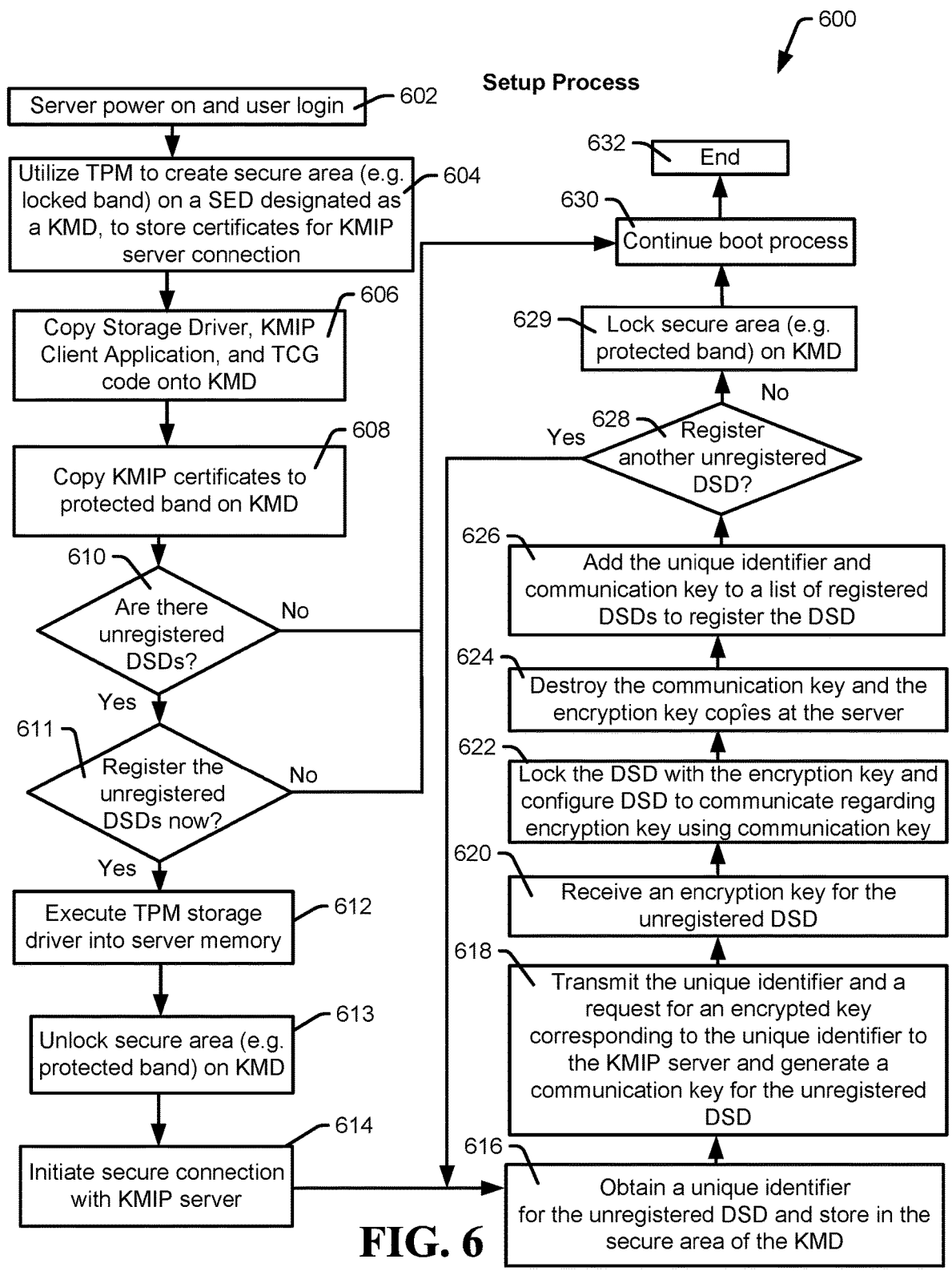
FIG. 6 is a flowchart of a method for unlocking self-encrypting data storage devices with a removable circuit, in accordance with certain embodiments of the present disclosure.

Referring to FIG. 6, certain embodiments of a method for unlocking self-encrypting data storage devices with a removable circuit are shown and generally designated 600. The method 600 may be implemented by the systems 100 and 200, according to certain embodiments. The method 600 can initialize systems 100 and 200 and register DSDs with a KMIP server.

The method 600 can start when a server is powered on, at 602. Once the server is running, the TPM may be utilized to create a secure storage area, such as a locked band, on a specific data storage device (e.g. SSD or HDD) designated as a KMD, at 604. The secure storage area can be utilized to store certificates to authenticate the DSDs connected to the server to the KMIP server. In some embodiments in which public/private key pairs are used by the secure communication module, a certificate authority may be contacted to obtain a public/private key pair and certificate for the KMD.

The method 600 may include copying an OS and associated code for the TPM interface, the KMIP client application, the key manager interface, and the TCG interface onto the KMD, at 606. In some examples, the TPM interface, the KMIP client application, the key manager interface, or the TCG interface may be downloaded from a server via a network interface and stored to the KMD. When the OS code(s) are already on the KMD and no updates are to be made, step 606 may be bypassed.

Once the OS codes are stored in the KMD, certificates from the KMIP server can be stored in the secure storage area, at 608. Then, the method 600 can include determining if there are any unregistered DSDs or bands connected to the server, at 610. When there are no unregistered DSDs or bands in the table, the process may continue with the normal boot process, at 630, or can end at 632.

In some embodiments, unregistered DSDs or bands may be determined automatically by polling DSDs attached to the server and comparing their unique identifiers to a list of registered devices stored in a memory. When unique identifiers obtained from the DSDs are not in the list of registered devices, those DSDs or bands may be registered. In some cases, a user may determine that there are unregistered DSDs or bands coupled to the server. For example, when a user connects a DSD to the server via a DSD interface, the DSD, and bands thereof, may be unregistered.

When there are unregistered DSDs or bands attached to the server, the method 600 can include determining if any of the unregistered DSDs or bands should be registered, at 611. When one or more unregistered DSDs are to be registered, the method 600 can include loading a TPM storage interface into memory, at 612, and unlocking a secure area of the KMD that stores KMIP authentication certificates, at 613. Utilizing the OS and the KMIP authentication certificates, the method 600 can then initiate a secure connection with a KMIP server, at 614. The method 600 can also obtain a unique identifier (e.g. serial number, or other identifier) for the unregistered DSD and store the unique identifier in the secure storage area of the KMD, at 616. The KMD may send a command to the DSD requesting the unique identifier to obtain the unique identifier.

The method 600 can include transmitting the unique identifier and a request for an encrypted key corresponding to the unique identifier to the KMIP server, at 618. In some embodiments, the KMD may send one or more packets to the KMIP server via the secure connection. The packets may include the unique identifier, and a command instructing the KMIP server to create an encrypted key corresponding to the unique identifier. The KMIP server may create the encrypted key, and store the encrypted key and the unique identifier to a memory accessible to the KMIP server. The KMIP server can transmit the encrypted key back to the KMD. In some instances, the KMIP server may already have an existing encrypted key associated with a specific DSD or band and the KMIP server can return an existing encrypted key for the known DSD or band. In addition, at 618, the method 600 may include generating a communication key. For example, in some embodiments in which the secure communication module may utilize a pre-shared key, the pre-shared key may be generated randomly using, for example, a time, a unique identifier of the DSD and a unique identifier of the KMD. In some embodiments in which public/private key pairs may be used by the secure communication module, a certificate authority may be contacted to obtain a public/private key pair and certificate for the DSD.

The method 600 can include receiving the encrypted key from the KMIP server, at 620. In some examples, the encrypted key may be received by the KMD, via the OS, and stored to a memory. Once the encrypted key has been received, the method 600 can include locking the DSD or band corresponding to the unique identifier with the encrypted key and configuring the DSD to communicate regarding the encrypted key using the communication key, at 622. In some embodiments, the KMD may send a TCG command and the encrypted key to the DSD with instructions to lock the DSD or band with the encrypted key. A TCG command may be a command that conforms to TCG protocols. The TCG command and the encrypted key can be transmitted to the DSD via a TCG interface. The TCG command may be encrypted using the PSK using a protocol like TLS or similar protocols. The command can include a request for an indicator to indicate if the lock operation was successful. If the lock operation was not successful, the command may be resent, aborted, or suspended pending action from the user. Similar commands may be performed for the communication key configuration. Also, an error message may be displayed and the error logged. The log can be stored to the KMD or another memory.

When the lock operation and communication configuration operation were successful, the local version of the encrypted key at the OS can be destroyed, at 624. For example, the communication key and the encrypted key may be erased from the memory in which it was stored for access by the OS. The unique identifier and the communication key may be added to a list of registered DSDs, such as a DIT, at 626. Once the unique identifier and the communication key are added to the list of registered DSDs, the DSD can be considered registered and the successful lock operation can be store in the log.

The method 600 can include determining if there are other unregistered DSDs to register, at 628. This could be done automatically or done manually via user input. For example, unregistered DSDs may be determined automatically by polling DSDs attached to the server and comparing their unique identifiers to a list of registered devices stored in a memory. When there are more unregistered DSDs to register, the method 600 can repeat steps starting at 616. When there are no more unregistered DSDs to register, the method 600 can include locking the secure storage area, at 629. Then, the method 600 may continue the boot process, at 630. In some examples, the boot process may include detecting or initializing other hardware components, loading applications into a memory, loading a native operating system into memory, other tasks, or any combination thereof. The method 600 can end, at 632.

One or more steps in the method 600 may be optional. For example, in certain embodiments, the steps 608 and 610 may be removed. Further, some ordering in which the steps are executed in the method 600 may be changed.

Figure 7:
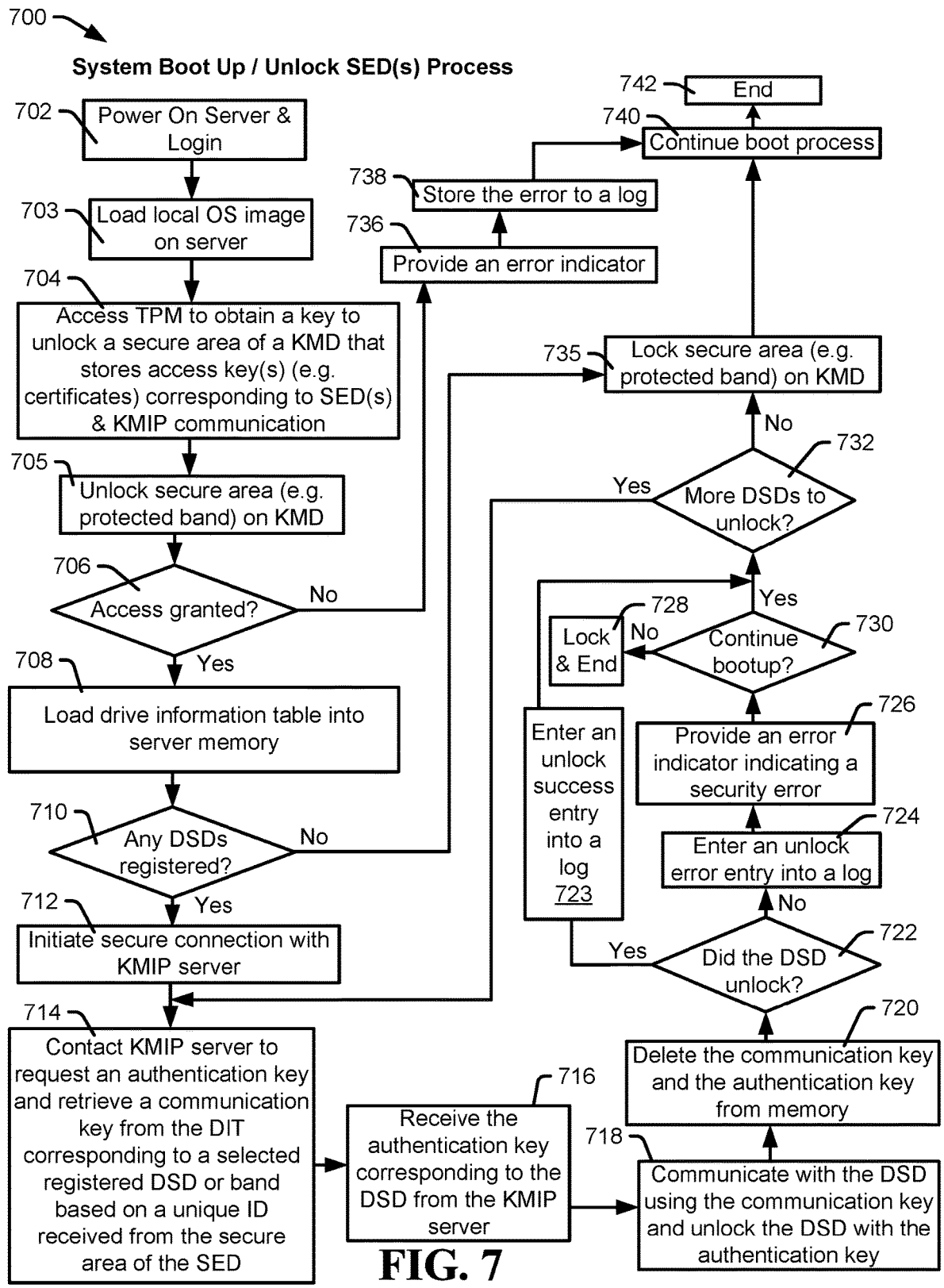
FIG. 7 is a flowchart of a method for unlocking self-encrypting data storage devices with a removable circuit, in accordance with certain embodiments of the present disclosure.

Referring to FIG. 7, certain embodiments of a method for unlocking self-encrypting data storage devices with a removable circuit are shown and generally designated 700. The method 700 may be implemented by the systems 100 and 200, according to certain embodiments. The method 700 can unlock DSDs using encrypted keys obtained from a key management server.

The method 700 can include powering on a server, at 702, and having the server's BIOS load a special operating system ("OS") into memory of the server, at 703. The special OS may be configured to perform the security functions and communications herein and may be stored on a KMD. The method 700 may also include accessing a TPM within the server to obtain a key to unlock a secure area of the KMD that stores access key(s) (e.g. certificates) corresponding to SED(s), at 704. The secure area of the KMD may also store information to establish a secure connection with the KMIP server. Once the OS has access to TPM, the OS may utilize the TPM to unlock the secure area on the KMD, at 705. If the TPM does not grant access to the secure area, the process may provide an error indicator, at 736, store the error to a log file, at 738, and may continue the boot process without unlocking any SEDs, at 740.

When access to the secure area of the KMD is granted, the OS may load the drive information table ("DIT") into the server memory, at 708, and the OS can determine if there are any DSDs or bands registered in the DIT, at 710. In some cases, unique identifiers obtained from connected DSDs can be compared against the list of registered DSDs to determine if there are any DSDs or bands in the DIT. If there are no DSDs registered in the DIT, the process may relock the secure area of the KMD, at 735, and may continue with the boot process without unlocking any SEDs, at 740. However, if there are DSDs registered in the DIT, the process may continue.

When at least one of the unique identifiers obtained from the DSDs coupled to the server corresponds to a unique identifier in the list of registered DSDs, a secure connection with a KMIP server can be initiated by the OS, at 712. Once a secure connection with a KMIP server has been established, the method 700 can include requesting a security key (e.g. encrypted key) corresponding to a selected registered DSD or band, at 714, by its unique stored ID. In addition, a communication key corresponding to a selected registered DSD or band may be retrieved from the secure storage area.

The method 700 can include receiving the encrypted key corresponding to the selected unique identifier from the KMIP server, at 716. When the encrypted key is received from the KMIP server via the secure connection, the encrypted key may be stored to a memory. If the encrypted key is not received from the KMIP server, a DSD corresponding to the encrypted key will not be unlocked, and an error message can be reported or logged.

Using the communication key for communications with the DSD, the registered DSD or band corresponding to the communication key, the encrypted key and the selected unique identifier may be unlocked by the encrypted key, at 718. The OS may also delete the local version of the communication key and the encrypted key from the memory, at 720. In some embodiments, an area of the memory in which the encrypted key was stored may be overwritten with data patterns, such as a pattern of 0's or 1's, to erase the security key from the memory. Further, other secure ways of deleting an encrypted key may be utilized.

The method 700 can include determining if the DSD was successfully unlocked, at 722. In some examples, the OS can determine if the DSD was successfully unlocked based on the DSD's response to the unlock command. For example, a DSD can transmit a successful return indicator to the OS when the unlock command was successfully executed, and a non-successful return indicator to the OS when the unlock command was not successfully executed.

The success or failure of each DSD to unlock may be logged. For example, when the DSD was successfully unlocked, an entry indicating the DSD was successfully unlocked may be entered into a log, at 723, and the method 700 can include determining if there are more DSDs to unlock, at 732. In some embodiments, the log may be stored in the KMD, in a server memory, in a portable memory, in another memory, or any combination thereof. When the DSD was not successfully unlocked, the method 700 can include entering an entry indicating the DSD was not successfully unlocked into a log of errors, at 724, and providing an error indicator indicating a security error, at 726.

In some embodiments, the method 700 may include providing the OS or a user with an option to stop the server's bootup process in response to a security error, at 730. When the process is elected to be stopped, the bootup process and the method 700 can end, at 728. In some examples, the user may not be provided with an option to continue or stop the bootup process, at 730; rather, the method 700 may automatically end, at 728, determine if there are other DSDs to unlock, at 732, or perform other operations. If the bootup process is ended, at 728, the method 700 can also lock the secure area on the KMD, at 728.

When the bootup process continues, the method 700 can include determining if there are any other registered DSDs or bands to unlock, at 732. In some embodiments, the OS can compare the unique identifiers obtained from the attached DSDs against a list of registered DSDs. If another of the unique identifiers obtained from the attached DSDs corresponds to a unique identifier from the list of registered DSDs, a request for an encrypted key corresponding to another selected unique identifier may be transmitted to a KMIP server and the corresponding a communication key may be retrieved, at 714, and the process can continue as described above. Further, the OS can determine when there are no more registered DSDs to unlock by requesting a registration status, an encrypted status, or both, from the attached DSDs. For example, a command may be sent to each of the attached DSDs to determine if any of the DSDs are still locked, or do not correspond to any unique identifier in the list of registered DSDs.

When all of the DSDs are unlocked, the method 700 can lock the secure area on the KMD, at 735, and proceed to continue a boot process, at 740. When some of the DSDs are still locked or are not in the list of registered DSDs, the method 700 can lock the secure area of the KMD, at 735, and then continue with the boot process, at 740.

In some systems, multiple encrypted keys may be obtained from a KMIP server at a time. For example, multiple unique identifies from the list of registered DSDs may be transmitted to the KMIP server in a single request for encrypted keys, and the KMIP server may transmit corresponding encrypted keys in a single response.

In some embodiments, an order in which the steps in the method 700 may be changed. For example, in certain embodiments, operation 726 may occur prior to operation 724, or operation 720 may occur after operation 722.

In some embodiments in which public/private key pairs are used by the secure communication module for the communication with the DSDs regarding unlocking the DSDs or bands thereof, a symmetric key may be generated by the OS using the public key of the DSD and the private key of the KMD and the DSD may generate a symmetric key using the private key of the DSD and the public key of the KMD instead of using the public keys alone. Other similar operations may be used.

Figure 8:
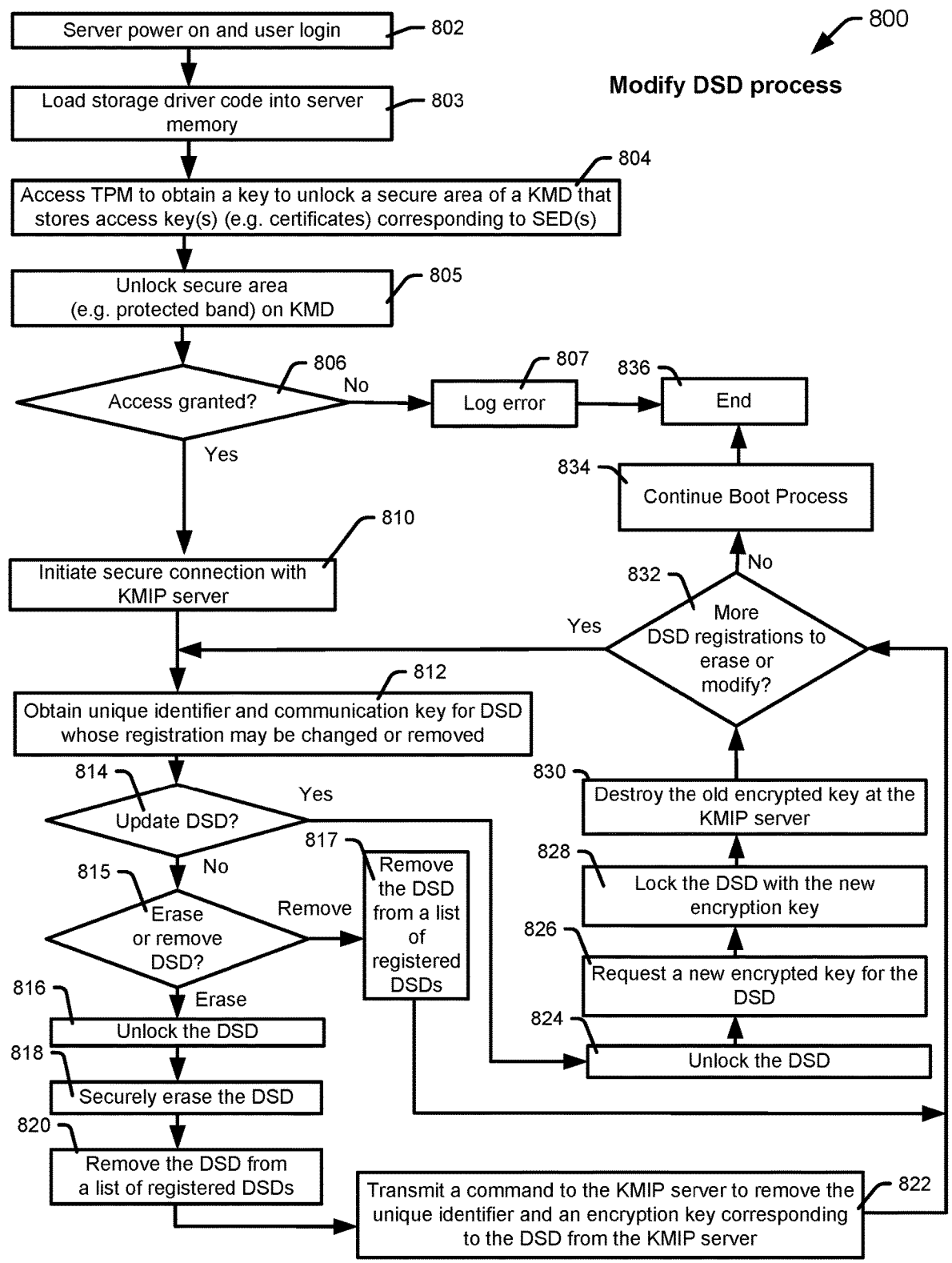
FIG. 8 is a flowchart of a method for unlocking self-encrypting data storage devices with a removable circuit, in accordance with certain embodiments of the present disclosure.

Referring to FIG. 8, certain embodiments of a method for unlocking self-encrypting data storage devices with a removable circuit are shown and generally designated 800. The method 800 may be implemented by the systems 100 and 200, according to certain embodiments. The method 800 can delete or modify DSD registration.

The method 800 can include powering on a server, at 802, and loading storage driver code, such as an operating system, into the server's memory, at 803. In some embodiments, a modified OS stored within a KMD can be loaded to run on the server and perform security operations to allow the KMD and server to perform the functions herein. The OS can interface with a TPM to provide access to a secure storage area of a KMD by obtaining a key to unlock the secure area, at 804, which can stores key(s) (e.g. certificates) corresponding to SED(s). The method can attempt to unlock the secure area via the TPM, at 805, and determine if access was granted, at 806. If access was not granted, the method may log an error, at 807, and stop, at 836.

If access was granted, the method may initiate a secure connection with a KMIP server, at 810. The method may also obtain a unique identifier and a communication key for a DSD whose registration may be changed or removed, at 812. In some examples, the KMD or other memory may include a list of DSDs to be unregistered and a list of DSDs whose registration may be changed or updated, and the KMD can select the unique identifier from the lists. The KMD can compare a DSD's unique identifier against a list of DSDs to be unregistered and a list of DSDs whose registration may change or need updating.

The method 800 can include determining if the selected DSD may be updated, at 814. When the selected DSD is to be updated, the method may use the communication key to communicate with and unlock the DSD, at 824, request a new encrypted key for the DSD, such as from a KMIP server, at 826, receive and lock the DSD with the new encrypted key, at 828, and destroy the old encrypted key at the KMIP server, at 830. In some embodiments, the communication key may be updated in a similar fashion. The method may then determine if more DSDs need erasing or updating, at 832. When there are no more DSD registrations to change or remove, the method 800 can include continuing the boot process, at 834, and ending, at 836.

The method 800 can include determining if the DSD to be unregistered can be erased, at 815. In some circumstances, a DSD can be removed without securely erasing the data. In some examples, an erase indicator corresponding to the DSD may be included in the list of DSDs. When the DSD is to be removed (and not erased), the method 800 can include removing the DSD from a list of registered DSDs, at 817, and determining if there are more DSD registrations to erase or modify, at 832.

When the DSD is to be erased, the method 800 can include, using the communication key to communicate with the DSD, unlocking the DSD, at 816. The method 800 can include securely erasing the unlocked DSD, at 818. In some embodiments, the DSD may be cryptographically erased. When a DSD is cryptographically erased, an encryption key protecting data of the DSD may be changed, and all record of the encryption key may be destroyed. Thus, any data encrypted by such key on the DSD may not be accessible. In some examples, the DSD may be physically erased using write patterns to continually overwrite the DSD, or a portion thereof, until no physical traces of useful data exist. In some embodiments, the communication key may be removed or changed in a similar fashion.

Once the DSD has been securely erased, the method 800 can include removing the DSD from a list of registered DSDs, at 820. The list of registered DSDs may be accessed and the unique identifier corresponding to the securely erased DSD may be removed.

The method 800 can then include transmitting a command to the KMIP server to remove (e.g. delete, erase) the unique identifier, the communication key and the encrypted key corresponding to the DSD from the KMIP server, at 822. The KMIP server may transmit a response to the KMD to indicate if the unique identifier and corresponding key were successfully erased.

The method 800 can include determining if there are more DSDs to be unregistered or DSDs whose registration may be changed, at 832. The method may determine if there are any more DSDs in the list of DSDs to unregister and the list of DSDs whose registration may be changed to determine if there are DSDs that have not yet been selected. When there are no more DSD registrations to change or DSDs to erase or remove, the method 800 can include continuing a boot process, at 834, and ending, at 836.

When there are more DSD registrations to change or DSDs to update, erase, or remove, the method 800 may repeat one or more of the steps.

One or more steps in the method 800 may be optional. Further, in some examples, an order in which steps in the method 800 are executed may change. For example, step 822 may be executed before step 820.

Figure 9:
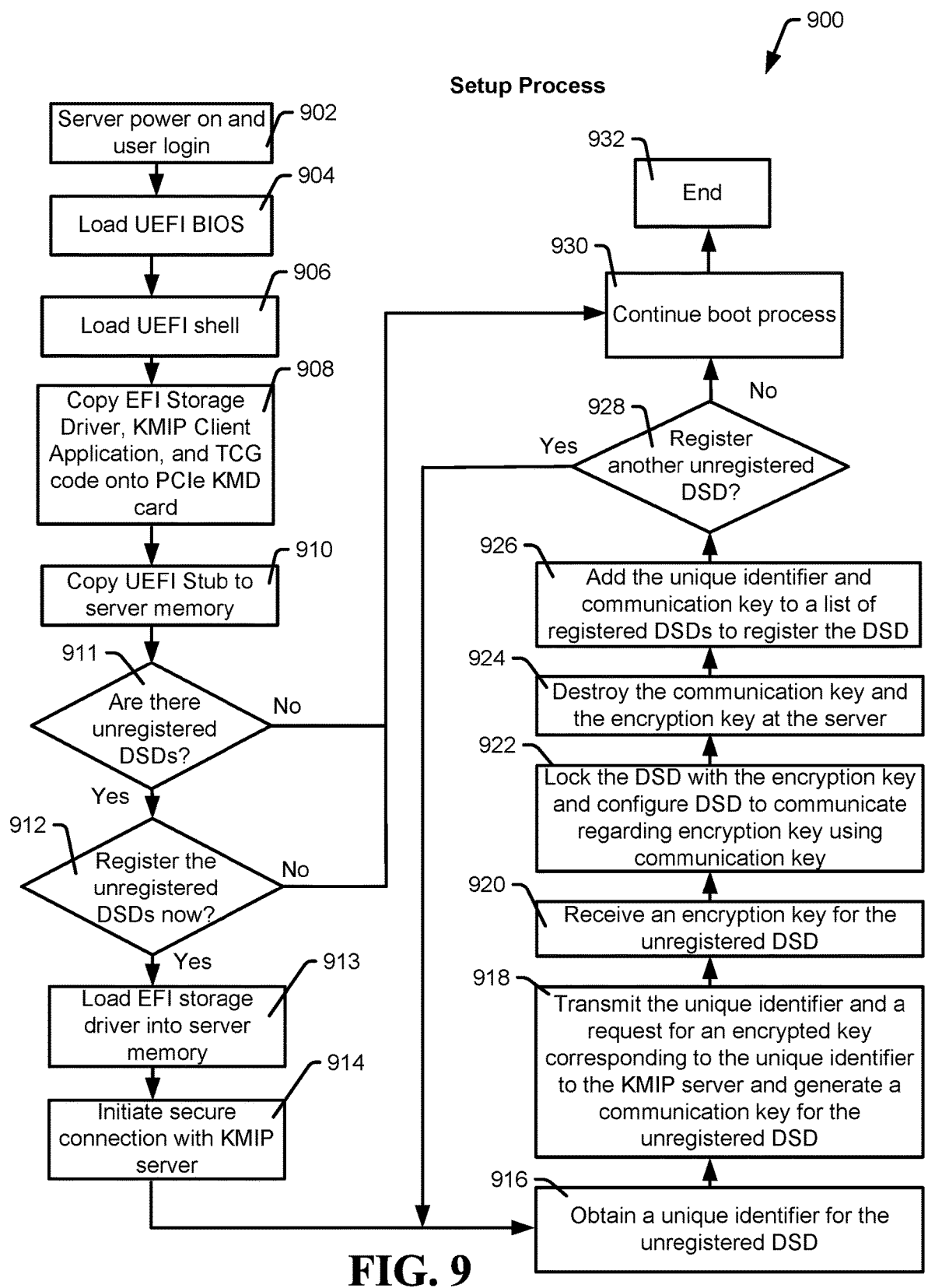
FIG. 9 is a flowchart of a method for unlocking self-encrypting data storage devices with a removable circuit, in accordance with certain embodiments of the present disclosure.

Referring to FIG. 9, certain embodiments of a method for unlocking self-encrypting data storage devices with a removable circuit are shown and generally designated 900. The method 900 may be implemented by the systems 100 and 300, according to certain embodiments. The method 900 can initialize systems 100 and 300 and register DSDs with a KMIP server.

The method 900 can include powering on a server. Powering on a server may include an operator logging into the server and entering a password, at 902, and loading a UEFI BIOS into memory, at 904. In some examples, the UEFI BIOS may include instructions to load a network driver corresponding to the server's network interface into a server memory. When the network driver is loaded in a server memory, applications may access the network interface.

The method 900 may include loading a UEFI shell into the server memory, at 906. A UEFI shell can provide a shell environment, which can be used to execute UEFI applications. In some examples, a shell environment may provide an interface between a user and internal parts of an operating system, such as the UEFI BIOS. For example, a UEFI shell may include a graphical user interface ("GUI") which can allow a user to launch applications or perform file system operations at the click of a mouse. In some examples a UEFI shell may include a command line interface ("CLI"). A CLI can allow a user or application to enter in commands and data via a command line. A command line can receive alphanumeric characters or symbols inputted from a user or application for storage or execution.

Methods used for launching a UEFI shell may depend on the manufacturer and model of the server's motherboard. In some cases, a motherboard may provide a direct option in firmware setup for launching the UEFI shell. For example, the UEFI shell may be available for launching when a compiled x86-64 version of the shell is available as "<EFI_SYSTEM_PARTITION>/SHELLX64.EFI". Some systems may have a UEFI shell embedded into the UEFI BIOS which can be launched by appropriate key press combinations. For example, a user might press the "delete" key or "F8" key on their keyboard at an appropriate time during the server's boot process. In other examples, the UEFI shell may be launched by storing the UEFI shell onto a bootable or non-bootable USB flash drive, compact disc, digital versatile disc, or other storage device. In some examples, a boot option associated with the compiled version of the UEFI shell may be manually added to the code of the UEFI shell via a command, such as a "bcfg" command or "efibootmgr" command. In some examples, a bcfg command can allow a user to create a boot entry by modifying a memory in which the UEFI shell is stored. In some examples, the efibootmgr command can create, reorder, and update boot entries. The compiled version of the UEFI shell may be an application created by compiling source code.

The UEFI shell may be configured to load a boot loader application into the server's memory. A boot loader may be an application that can be called to load data and other applications into the server's memory. Applications that are loaded into the server's memory may be executed (processed), and data loaded into the server's memory may be available to applications.

The method 900 may include copying an EFI storage driver, EFI KMIP client application, and TCG interface code onto a KMD card, at 906. In some examples, the EFI storage driver, EFI KMIP client application, and TCG interface code may be loaded into a memory of the KMD card by the boot loader. For example, a user may install the EFI storage driver, EFI KMIP client application, and TCG interface via the UEFI shell during an initial installation or during periodic updates. The EFI storage driver, EFI KMIP client application, and TCG interface code may be loaded to the server memory from a USB flash drive, compact disc, hard disc, or other storage device, and copied to the KMD card. In some examples, the EFI storage driver, EFI KMIP client application, and TCG interface code may be downloaded from a server via a network interface and stored to the KMD. In some examples, examples the EFI storage driver, EFI KMIP client application, and TCG interface code may be installed in the KMD when the KMD is manufactured. When the EFI storage driver, EFI KMIP client application, and TCG interface code are already on the KMD and no updates are to be made, 908 may be bypassed. In some embodiments, the EFI storage driver, EFI KMIP client application, and TCG interface code may be stored to the KMD using security protocols to verify their authenticity. In some embodiments in which public/private key pairs are used by the secure communication module, a certificate authority may be contacted to obtain a public/private key pair and certificate for the KMD.

The method 900 may copy a UEFI stub code into the UEFI shell, at 910. In some embodiments, the UEFI stub code may be installed into the UEFI shell during an initial installation of the KMD into the server. The UEFI stub code may be copied from a hard disc, flash memory, compact disc, or other memory, and inserted into the UEFI shell's code. In some embodiments, the UEFI stub code may be included in the KMD, or may be downloaded via the server's network adapter. In some cases, the UEFI stub may include instruction code to call functions stored in a KMD. For example, the UEFI stub may include instructions to load the EFI storage driver, EFI KMIP application, and TCG interface from the KMD into the server's memory. A boot loader can process the instructions to load the EFI storage driver from the KMD into the server's memory. In some cases, when a UEFI stub is already installed into the UEFI shell's code, 910 may be bypassed.

The method 900 can include determining if there are any unregistered DSD attached to the server, at 911. In some embodiments, unregistered DSDs may be determined automatically by polling DSDs attached to the server and comparing their unique identifiers to a list of registered devices stored in a memory. When unique identifiers obtained from the DSDs are not in the list of registered devices, those DSDs may be registered. In some cases, a user may determine that there are unregistered DSDs coupled to the server. For example, when a user connects a DSD to the server via a DSD interface, the DSD may be unregistered. When there are no unregistered DSDs attached to the server, the method can including continuing the server's boot process, at 930.

When there are unregistered DSDs attached to the server, the method 900 can include determining if any of the unregistered DSDs should be registered, at 912. In some examples, a user may start a registration process of one or more unregistered DSDs by entering a command to register a selected unregistered DSD via a UEFI shell. In some examples, instructions may be included in a KMD or UEFI stub to automatically detect and register unregistered DSDs.

When one or more unregistered DSDs are to be registered, the method 900 can include loading an EFI storage driver into memory, at 913, and initiating a secure connection with a KMIP server, at 914. In some embodiments, a user can load the EFI storage driver in the server's memory via the UEFI shell. When the EFI storage driver is loaded into the server's memory, code in the KMD's EFI KMIP client application module and TCG interface module may be accessible to the UEFI shell. Thus, the UEFI shell can load instructions in an EFI KMIP client application in response to the user's command to initiate a secure connection with the KMIP server, at 914. In some embodiments, the EFI KMIP client application may connect with the KMIP server using a TLS or SSL protocol to secure the connection.

The method 900 can include obtaining a unique identifier for an unregistered DSD, at 916. In some embodiments, the unique identifier may be obtained automatically by the KMD or other circuit. The KMD may send a command to the DSD requesting the unique identifier. When the DSD provides the KMD with its unique identifier in response to the command, the KMD may store the unique identifier in a memory. In some embodiments, a user may enter the unique identifier into a memory via the UEFI shell. In some cases, a user may type the unique identifier into a command line interface, and the command line interface can store the unique identifier to a memory. The memory may be located in the KMD, the server, or other location.

The method 900 can include transmitting the unique identifier and a request for an encryption key corresponding to the unique identifier to the KMIP server, at 918. In some embodiments, the KMD may send one or more packets to the KMIP server via the secure connection. The packets may include the unique identifier, and a command instructing the KMIP server to create an encryption key corresponding to the unique identifier. The KMIP server may create the encryption key, and store the encryption key and the unique identifier to a memory accessible to the KMIP server. The KMIP server can transmit the encryption key back to the KMD. In addition, the KMD may generate a communication key corresponding to the unique identifier for the unregistered DSD, at 918.

At 920, the method 900 can include receiving the encryption key from the KMIP server. In some examples, the encryption key may be received by the KMD and stored to a memory. Once the encryption key has been received, the method 900 can include locking the DSD corresponding to the unique identifier with the encryption key and configuring the DSD to communicate regarding the encrypted key using the communication key, at 922, which may be performed by the UEFI BIOS operating on the server. In some embodiments, the KMD may send a TCG command and the encryption key to the DSD with instructions to lock with the encryption key. A TCG command may be a command that conforms to TCG protocols. The TCG command and the encryption key can be transmitted to the DSD via a TCG interface. The command can include a request for an indicator to indicate if the lock operation was successful. If the lock operation was not successful, the command may be resent, aborted, or suspended pending action from the user. Similar commands may be performed for the communication key configuration. Also, an error message may be displayed and the error logged. The log can be stored to the KMD. In some embodiments in which the secure communication module utilizes a pre-shared key, the pre-shared key may be generated randomly using, for example, a time, a unique identifier of the DSD and a unique identifier of the KMD. In some embodiments in which public/private key pairs are used by the secure communication module, a certificate authority may be contacted to obtain a public/private key pair and certificate for the DSD.

When the lock operation and communication configuration operation were successful, the user may be provided with an indicator indicating a successful lock operation, and the communication key and the encryption key will be destroyed, at 924. For example, the encryption key may be erased from the memory in which it was stored. The unique identifier and the communication key may be added to a list of registered DSDs, at 926. In some cases, the unique identifier may automatically be added to a list of registered DSD already stored in the KMD. In some embodiments, a user may manually enter the unique identifier to the list of registered DSDs. Once the unique identifier and the communication key are added to the list of registered DSDs, the DSD can be considered registered and the successful lock operation can be logged. The log can be stored to the KMD.

The method 900 can include determining if there are other unregistered DSDs to register, at 928. In some embodiments, an interface, such as the command line interface, can prompt the user to indicate whether there are more unregistered DSDs to register. In some embodiments, a KMD may automatically determine if there are other DSDs to register. For example, unregistered DSDs may be determined automatically by polling DSDs attached to the server and comparing their unique identifiers to a list of registered devices stored in a memory. When there are more unregistered DSDs to register, the method 900 can include obtaining a unique identifier for another unregistered DSD, at 916. When there are no more unregistered DSDs to register, the method 900 can include continuing the boot process, at 900. In some examples, the boot process may include detecting or initializing other hardware components, loading applications into a memory, loading an operating system into memory, other tasks, or any combination thereof. The method 900 can end, at 932.

One or more steps in the method 900 may be optional. For example, in certain embodiments, the steps 908 and 910 may be removed. Further, some ordering in which the steps are executed in the method 900 may be changed.

Figure 10:
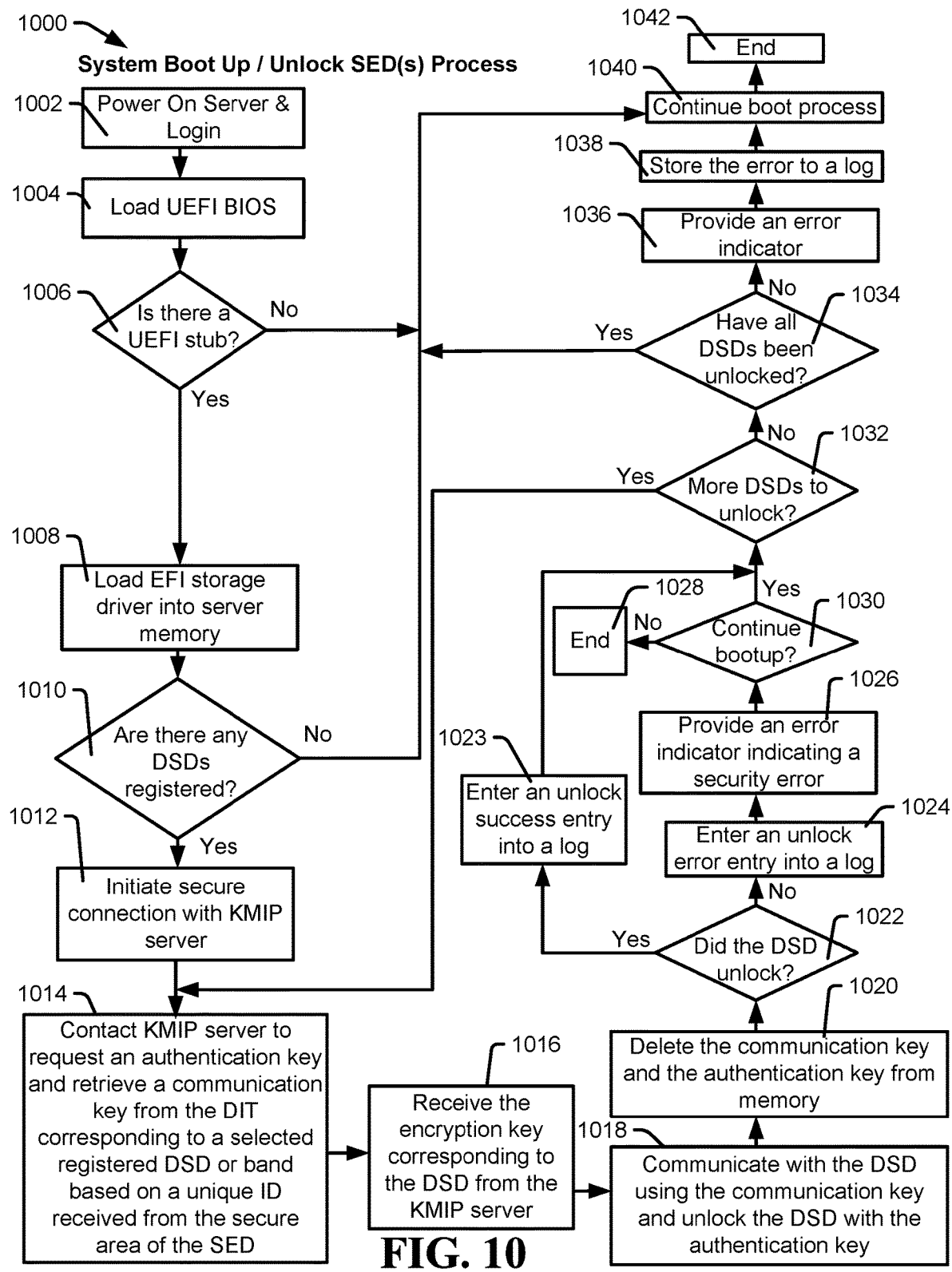
FIG. 10 is a flowchart of a method for unlocking self-encrypting data storage devices with a removable circuit, in accordance with certain embodiments of the present disclosure.

Referring to FIG. 10, certain embodiments of a method for unlocking self-encrypting data storage devices with a removable circuit are shown and generally designated 1000. The method 1000 may be implemented by the systems 100 and 300, according to certain embodiments. The method 1000 can unlock DSDs using encryption keys obtained from a key server.

The method 1000 can include powering on a server, at 1002, and loading a UEFI BIOS into memory, at 1004. In some examples, a server may perform a power on self-test ("POST"), load a network driver, load other drivers or applications, or any combination thereof. For example, a server's motherboard may include one or more processors, such as a central processing unit ("CPU"). The processors may load drivers or applications into a server memory where the processors may then process the drivers or applications.

At 1006, the method 1000 can determine if a UEFI BIOS includes a UEFI stub. In some embodiments, a processor may determine if the UEFI BIOS includes a UEFI stub as code in the UEFI BIOS is processed. When the UEFI BIOS does not include a UEFI stub, the method 1000 can include continuing a boot process, at 1040, and when the boot process is finished, the method 1000 can end, at 1042.

When the UEFI BIOS includes a UEFI stub, the UEFI stub can be processed by a processor to load an EFI storage driver into a server memory, at 1008, and the method 1000 can include determining if there are any registered DSDs coupled to the server, at 1010. In some embodiments, registered DSDs may be determined by a KMD. The KMD may include information that, when processed by a processor, cause the processor to transmit a command to each of the attached DSDs requesting their unique identifiers. In some cases, the command may be sent to the DSDs via a data controller with SED support and a TCG interface. The unique identifiers obtained from the attached DSDs can be compared against a list of registered DSDs stored in a memory, such as a memory in the KMD. When none of the unique identifiers obtained from the attached DSDs correspond to the unique identifiers in the list of registered DSDs, the method 1000 can include continuing the server's boot process, at 1040, and ending, at 1042.

When at least one of the unique identifiers obtained from the DSDs coupled to the server corresponds to a unique identifier in the list of registered DSDs, a secure connection with a KMIP server can be initiated, at 1012. For example, instructions stored in a KMD may be executed by a processor to initiate a TLS or SSL connection between a KMD a KMIP server. In some examples, instructions in the KMD may be executed by a processor to cause the processor to send and receive commands and data to a KMIP server via a PCIe interface and a network interface.

Once a secure connection with a KMIP server has been established, the method 1000 can include requesting a security key (i.e. encryption key) corresponding to a selected registered DSD, at 1014, by its unique stored ID. In some embodiments, instructions stored in a KMD may be executed to cause the processor to send a request to the KMIP server for an encryption key corresponding to a selected unique identifier. The request may include one or more packets of data transmitted via the secure connection.

The packets of data can include the selected unique identifier, a command to obtain the encryption key corresponding to the selected unique identifier, server identification, or other information. In addition, the method 1000 can include retrieving a communication key from a secure storage area corresponding to a selected registered DSD or band, at 1014, by its unique stored ID.

The method 1000 can include receiving the encryption key corresponding to the selected unique identifier from the KMIP server, at 1016. When the encryption key is received from the KMIP server via the secure connection, the encryption key may be stored to a memory, such as a memory in the KMD. If the encryption key is not received from the KMIP server, a DSD corresponding to the encryption key will not be unlocked, and an error message can be reported to a user, such as via a UEFI shell or other interface. Further, an entry may be included in a log file indicating the unsuccessful unlock operation, and the log file may be stored to a memory.

Using the communication key for communications with the DSD, the registered DSD corresponding to the communication key, the encryption key and the selected unique identifier may be unlocked by the encryption key, at 1018. In some embodiments, a KMD may include instructions that, when executed by a processor, cause the processor to transmit the encryption key and an unlock command to the registered DSD. At 1020, the method 1000 can include removing the communication key and the encryption key from the memory. In some embodiments, an area of the memory in which the encryption key was stored may be overwritten with data patterns, such as a pattern of 0's or 1's, to erase the security key from the memory. Further, other secure ways of deleting an encryption key may be utilized.

The method 1000 can include determining if the DSD was successfully unlocked, at 1022. In some examples, the KMD can determine if the DSD was successfully unlocked based on the DSD's response to the unlock command. For example, a DSD can transmit a successful return to the KMD when the unlock command was successfully executed, and a non-successful return to the KMD when the unlock command was not successfully executed.

The success or failure of each DSD to unlock may be logged. For example, when the DSD was successfully unlocked, an entry indicating the DSD was successfully unlocked may be entered into a log, at 1023, and the method 1000 can include determining if there are more DSDs to unlock, at 1032. In some embodiments, the log may be stored in the KMD, in a server memory, in a portable memory, in another memory, or any combination thereof. When the DSD was not successfully unlocked, the method 1000 can include entering an entry indicating the DSD was not successfully unlocked into a log of errors, at 1024, and providing an error indicator indicating a security error, at 1026. The error indicator may be provided via the UEFI BIOS shell, audible beeps, or with other indicators.

In some embodiments, the method 1000 may include providing a user with an option to stop the server's bootup process, at 1030. The user may enter their decision to continue or stop the bootup process via the UEFI BIOS shell or other interface when the DSD was not successfully unlocked. When the user elects to stop the bootup process, the method 1000 can end, at 1032. In some examples, the user may not be provided with an option to continue or stop the bootup process, at 1030. Rather, the method 1000 may automatically end, at 1028, determine if there are other DSDs to unlock, at 1032, or perform other operations.

When the user elects to continue the bootup process, the method 1000 can include determining if there are any other registered DSDs to unlock, at 1032. In some embodiments, the KMD may include instructions that when executed by the processor, cause the processor to compare the unique identifiers obtained from the attached DSDs against a list of registered DSDs. If another of the unique identifiers obtained from the attached DSDs corresponds to a unique identifier from the list of registered DSDs, a communication key and a request for an encryption key corresponding to another selected unique identifier may be transmitted to a KMIP server, at 1014.

When there are no more registered DSDs to unlock, the method 1000 can include determining if all of the DSDs coupled to the server were unlocked, at 1034. In some examples, the KMD can determine when there are no more registered DSDs to unlock by requesting a registration status, an encryption status, or both, from the attached DSDs. For example, a command may be sent to all of the attached DSDs to determine if any of the DSDs are still locked, or do not correspond to any unique identifier in the list of registered DSDs.

When all of the DSDs are unlocked, the method 1000 can include continuing a boot process, at 1040. When some of the DSDs are still locked or are not in the list of registered DSDs, the method 1000 can include providing an error indicator indicating some of the DSDs have not been successfully unlocked, at 1036, and storing the error to a log, at 1038.

In some systems, multiple encryption keys may be obtained from a KMIP server at a time. For example, the list of registered DSDs may be transmitted to the KMIP server in a single request for encryption keys, and the KMIP server may transmit all of the requested encryption keys in a single response.

In some embodiments, an order in which the steps in the method 1000 may be changed. For example, in certain embodiments, operation 1028 may occur prior to operation 1026.

In some embodiments in which public/private key pairs are used by the secure communication module for the communication with the DSDs regarding unlocking the DSDs or bands thereof, a symmetric key may be generated by the UEFI BIOS using the public key of the DSD and the private key of the KMD and the DSD may generate a symmetric key using the private key of the DSD and the public key of the KMD instead of using the public keys alone. Other similar operations may be used.

Figure 11:
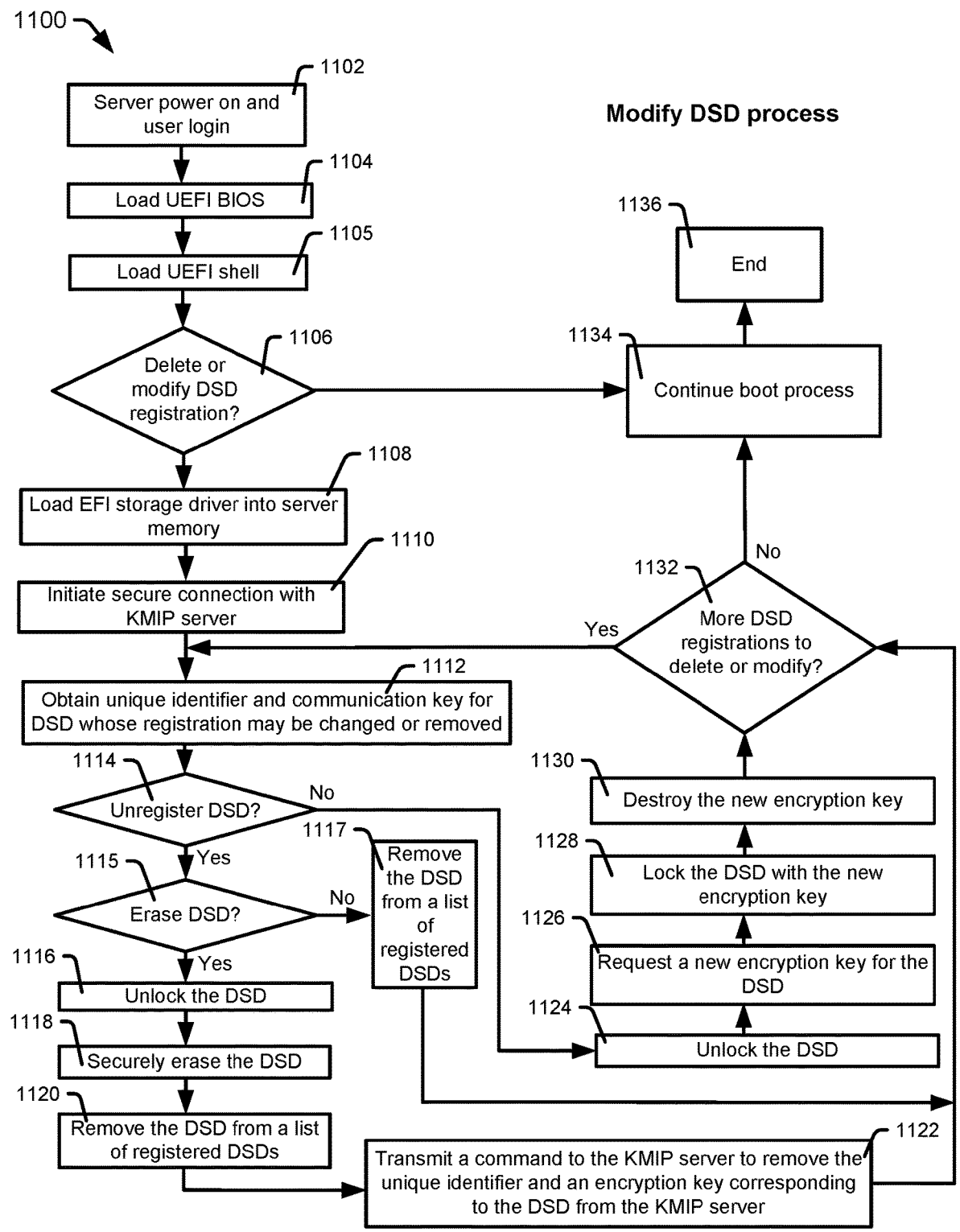
FIG. 11 is a flowchart of a method for unlocking self-encrypting data storage devices with a removable circuit, in accordance with certain embodiments of the present disclosure.

Referring to FIG. 11, certain embodiments of a method for unlocking self-encrypting data storage devices with a removable circuit are shown and generally designated 1100. The method 1100 may be implemented by the systems 100 and 300, according to certain embodiments. The method 1100 can delete or modify DSD registration.

The method 1100 can include powering on a server, at 1102, loading a UEFI BIOS into memory, at 1104, and loading a UEFI shell into the server memory, at 1105. The UEFI shell may include a GUI, CLI, or both, and can enable a user to input instructions into a server memory for processing by a processor.

The method 1100 can include determining if any DSDs coupled to the server should be unregistered or have their registration modified, at 1106. When a DSD is unregistered, its data may be erased, its unique identifier may be removed from a list of registered DSDs, and a corresponding encryption key may be removed from a KMIP server. When a DSDs registration is modified, an encryption key associated with the DSD may be changed.

In some embodiments, a user can determine if there are any DSDs to unregister or whose registration should be modified by inputting instructions into the server memory via the UEFI shell. The instructions can indicate if there are any DSDs to unregister or whose registration may be changed. In some examples, a KMD may automatically determine if there are any DSDs to unregister or whose registration may be changed. For example, the KMD may include a list of DSDs to unregister, a list of DSDs whose registration may be changed, other lists of DSDs, or any combination thereof. In some embodiments, a user can specify a list of drives to unregister or whose registrations may be changed. In some embodiments, a user can instruct the KMD to unregister or change the registration of the attached DSDs one by one. When there are no DSD registrations to change or remove, the method 1100 can include continuing the boot process, at 1134, and ending, at 1136. When there are DSD registrations to change or remove, the method 1100 can include loading an EFI storage driver into a server memory, at 1108, and initiating a secure connection with a KMIP server, at 1110.

At 1112, the method 1100 may determine a unique identifier and a communication key corresponding to a DSD whose registration may be changed or removed. In some embodiments, a user may enter upload the unique identifier to a memory via the UEFI shell. In some embodiments, the unique identifier may be selected from a list of DSDs whose registration may be changed or removed. In some examples, the list may be stored in a KMD or other memory, such as a removable flash drive. In some examples, the KMD or other memory may include a list of DSDs to be unregistered and a list of DSDs whose registration may be changed, and the KMD can select the unique identifier from the lists.

The method 1100 can include determining if the selected DSD may be unregistered, at 1114. In some embodiments, a user can determine if the DSD may be unregistered. The user can upload an indicator to a memory via the UEFI shell indicating if the selected DSD may be unregistered. In some embodiments, a KMD can compare a DSD's unique identifier against a list of DSDs to be unregistered and a list of DSDs whose registration may change. When the selected unique identifier is selected from the list of DSDs to be unregistered, the selected DSD may be unregistered.

Once the selected unique identifier has been obtained, the method 1100 can include determining if the DSD to be unregistered can be erased, at 1115. In some circumstances, a user may unregister the DSD without securely erasing the data. In some embodiments, the user may be prompted to choose between securely erasing the DSD and then unregistering the DSD, or just unregistering the DSD without securely erasing the DSD via the UEFI shell. In some examples, an erase indicator corresponding to the DSD may be included in the list of DSDs. When the DSD is not to be erased, the method 1100 can include removing the DSD from a list of registered DSDs, at 1117, and determining if there are more DSD registrations to delete or modify, at 1132.

When the DSD is to be erased, the method 1100 can include unlocking the DSD to be unregistered, at 1116. The unique identifier and a request for an encryption key may be transmitted to a KMIP server. When the KMD receives the encryption key from the KMIP server, the DSD can be unlocked. When the selected DSD may not be unregistered, the method 1100 can include using the communication key to communicate with and unlocking the selected DSD, at 1124.

The method 1100 can include securely erasing the unlocked DSD, at 1118. In some embodiments, the DSD may be cryptographically erased. When a DSD is cryptographically erased, the encryption key for the DSD may be changed, and all record of the encryption key may be destroyed. Thus, any data on the DSD may not be accessible. In some examples, the DSD may be physically erased using write patterns to continually overwrite the DSD until no physical traces of useful data exist.

Once the DSDs have been securely erased, the method 1100 can include removing the DSD from a list of registered DSDs, at 1120. The list of registered DSDs can include unique identifiers corresponding to DSDs attached to a server. The list of registered DSDs may be opened and the unique identifier corresponding to the securely erased DSD may be removed.

The method 1100 can include transmitting a command to the KMIP server to remove (e.g. delete, erase) the unique identifier and the encryption key corresponding to the DSD from the KMIP server, at 1122. In some embodiments, the KMD may include instructions that, when executed by a processor, cause the processor to transmit a unique identifier and a command to the KMIP server. The command can include instructions for the KMIP server to securely erase the unique identifier and an encryption key corresponding to the unique identifier from the KMIP server. The KMIP server may transmit a response to the KMD to indicate if the unique identifier and corresponding encryption key were successfully erased.

At 1132, the method 1100 can include determining if there are more DSDs to be unregistered or DSDs whose registration may be changed, at 1134. In some embodiments, a user may determine if there are any more DSDs to unregister or DSDs whose registration may be changed. In some examples, a processor may execute instructions included in the KMD to determine if there are any more DSDs in the list of DSDs to unregister and the list of DSDs whose registration may be changed to determine if there are DSDs that have not yet been selected. When there are no more DSD registrations to change or DSDs to unregister, the method 1100 can include continuing a boot process, at 1134, and ending, at 1136.

When there are more DSD registrations to change or DSDs to be unregistered, the method 1100 can include determining a unique identifier corresponding to a DSD whose registration may be changed or removed, and determining if the selected DSD may be unregistered, at 1114. When the DSD may not be unregistered, the selected DSD may be unlocked, at 1124.

The method 1100 can include requesting a new encryption key for the DSD, at 1126. In some embodiments, the KMD may include information that may be executed by a processor to transmit a request to the KMIP server for a new encryption key. The KMIP server may create a new encryption key and transmit the new encryption key to a memory in the KMD. When the KMIP server creates a new encryption key, the KMIP server can associate the new encryption key with the unique identifier, and erase the old encryption key stored in a memory accessible to the KMIP server.

When the new encryption key is received by the KMD, the method 1100 can include locking the DSD with the new encryption key, at 1128, and destroying the encrypting key stored in the KMD memory, at 1130. In some embodiments, the communication key may be updated in a similar fashion.

The method 1100 can include determining if there are more DSD registrations to modify or DSDs to unregister, at 1132.

One or more steps in the method 1100 may be optional. For example, in certain embodiments, step 1105 may be removed. Further, in some examples, an order in which steps in the method 1100 are executed may change. For example, step 1122 may be executed before step 1120.

Figure 12:
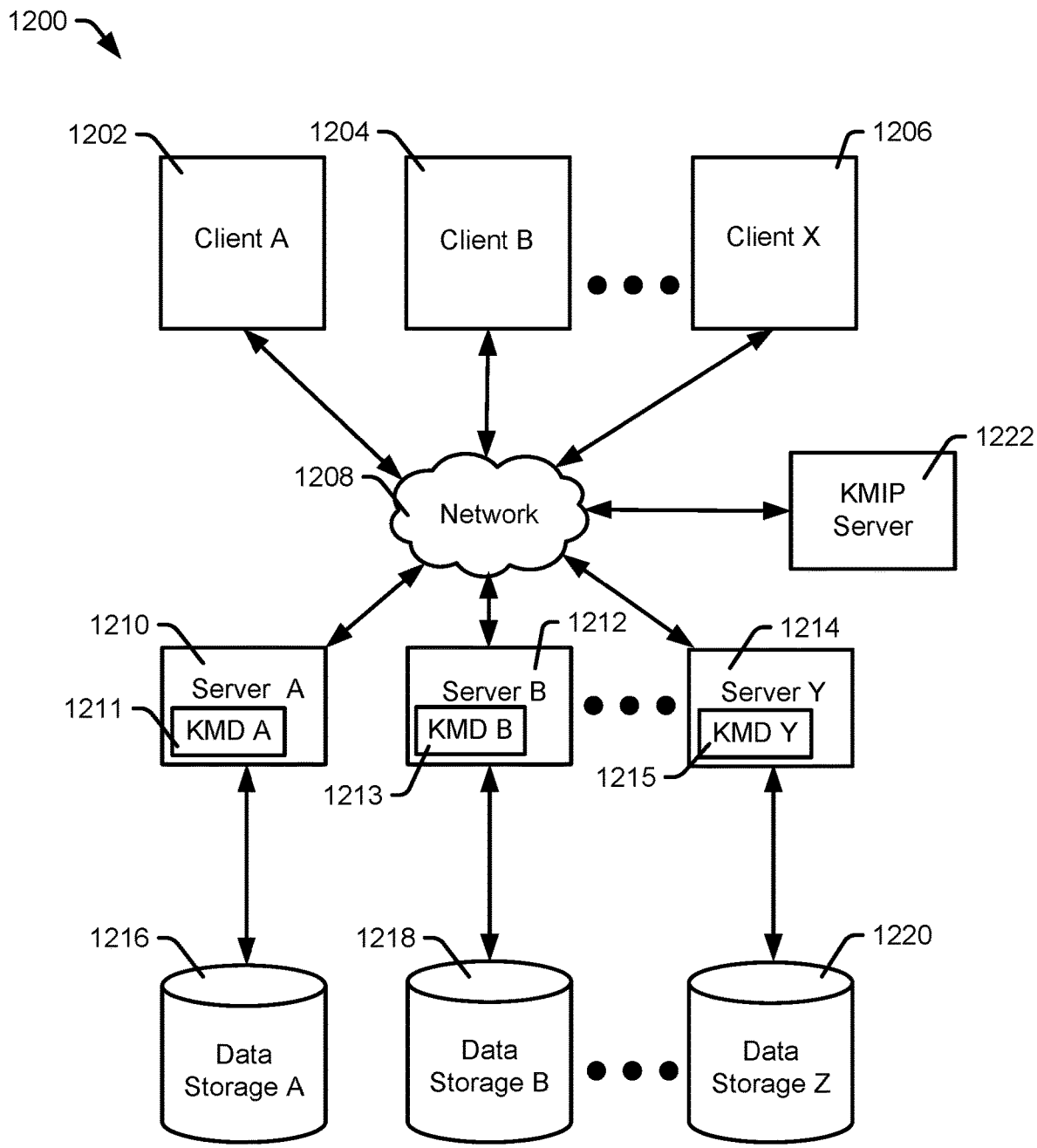
FIG. 12 is a diagram of a system of a removable circuit for unlocking self-encrypting data storage devices, in accordance with certain embodiments of the present disclosure.

Referring to FIG. 12, certain embodiments of a system of a removable circuit for unlocking self-encrypting data storage devices are shown and generally designated 1200. The system 1200 may be an example of the systems 100, 200 and 300, according to certain embodiments. The system 1200 may be an example of a distributed file system with a KMIP server, and may implement systems 100, 200 and 300, and methods 400-1100, according to certain embodiments.

The distributed file system can allow one or more client nodes (e.g. A 1202, B 1204, and X 1206) to access data in arrays of data storage (e.g. A 1216, B 1218, and Y 1220) via a network 1208. Servers A 1210, B 1212, and Y 1214 can include KMDs A 1211, B 1213, and Y 1215 may be coupled to the arrays of data storage A 1216, B 1218, and Z 1220, respectively. In some examples, servers A 1210, B 1212, and Y 1214 may store data to, or obtain data from, the arrays of data storage A 1216, B 1218, and Z 1220 in response to client requests.

In some embodiments, the servers A 1210, B 1212, and Y 1214, may be coupled to a KMIP server 1222 via the network 1208. When the servers A 1210, B 1212, and Y 1214 power up, KMDs A 1211, B 1213, and Y 1215 may transmit a request for keys corresponding to the DSDs in data storage A 1216, B 1218, and Z 1220, to the KMIP server 1222. In some examples, the KMD 1211 in a server A 1210 may be communicatively coupled to data storage 1218, and the KMD 1211 can manage the certificates and access of data storage 1218.

In some examples, when the clients A 1202, B 1204, or X 1206, want to store or obtain data, a file system operation request may be transmitted to one or more of the servers A 1210, B 1212, and Y 1214 via the network 1208. The servers A 1210, B 1212, and Y 1214 may store all or part of the data to their corresponding data arrays of storage.

In some cases, servers A 1210, B 1212, and Y 1214 may be file system servers, metadata servers, or other servers.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
    a data storage device configured to:
        connect to be removable from a first server;
        load a key management system stored locally in the data storage device into a memory of the first server, the key management system configured to:
            unlock a secure storage area of the data storage device and retrieve a drive information table and an authentication certificate stored within the secure storage area, the drive information table including information to identify data storage devices having corresponding encryption keys registered with a second server;
            transmit, from the first server to the second server, a request for an encrypted key corresponding to an encrypted storage device ("ESD") when the ESD is listed in the drive information table, the request including the authentication certificate;
            retrieve a communication key corresponding to the ESD from the secure storage area;
            receive the encrypted key from the second server in response to sending the authentication certificate; and
            unlock a secure storage area of the ESD with the encrypted key, the key management system configured to use the communication key to secure communication between the key management system and the ESD while performing the unlock of the secure storage area of the ESD.

2. The apparatus of claim 1 further comprising:
    the key management system configured to:
        determine a unique identifier corresponding to the ESD;
        determine if the ESD is listed in the drive information table;
        when the unique identifier is listed in the drive information table, provide the authentication certificate and the request for the key corresponding to the ESD to the second server; and
        receive the key from the second server and provide the key to the ESD to unlock the ESD.

3. The apparatus of claim 2 further comprising:
    the data storage device configured to:
        connect to be removable from the first server by a physical and electrical connection to the first server which allows the data storage device to be removed from the first server without physically modifying the first server.

4. The apparatus of claim 1 further comprising:
    the key management system configured to:
        access an encrypted hardware module of the first server;
        obtain access to the secure storage area of the data storage device via the encrypted hardware module; and
        retrieve the authentication certificate from the secure data storage area when access is granted to the key management system.

5. The apparatus of claim 1 further comprising:
    the key management system configured to:
        determine if there is an unregistered ESD coupled to the first server, where the unregistered ESD not have a corresponding key stored in the second server;
        obtain a unique identifier from the unregistered ESD;

provide the unique identifier and a request for a corresponding key to the second server;
receive the corresponding key from the second server;
lock the unregistered ESD with the corresponding key;
generate another communication key; and
configure the unregistered ESD to communicate with the key management system to unlock the unregistered ESD based at least in part on the other communication key.

6. The apparatus of claim 1 further comprising:
the key management system configured to:
determine if there is a registered ESD to be unregistered coupled to the first server;
obtain a unique identifier from the registered ESD to be unregistered;
retrieve another communication key based on the unique identifier;
provide the unique identifier and a request for a key to the second server;
receive the key from the second server;
unlock the registered ESD to be unregistered with the key to unregister the ESD, the key management system configured to use the other communication key to secure communication between the key management system and the registered ESD while performing the unlock of the registered ESD;
erase the unregistered ESD; and
transmit a command to the second server to remove the unique identifier and the key from the second server.

7. The apparatus of claim 1 further comprising:
the key management system configured to:
determine if there is an ESD registration to modify corresponding to an ESD coupled to the first server;
obtain a unique identifier from the corresponding ESD;
retrieve another communication key based on the unique identifier;
provide the unique identifier and a request for a key to the second server;
receive the key from the second server;
unlock the corresponding ESD with the key, the key management system configured to use the other communication key to secure communication between the key management system and the corresponding ESD while performing the unlock of the corresponding ESD;
provide the unique identifier and a request for another key to the second server;
receive the another key from the second server; and
lock the corresponding ESD with the another key.

8. A system comprising:
a data storage device configured to be connectable and removable from a first server, the data storage device including:
an interface circuit;
a secure nonvolatile data storage area;
a secure storage information table stored within the secure nonvolatile data storage area, the secure storage information table identifying whether encrypted data storage memories or devices connected to the first server have encryption keys registered with a second server;
a memory storing a key management system;
a controller configured to:
load the key management system into the memory of the first server, the key management system configured to:
access a hardware encryption circuit of the first server;
obtain access to the secure nonvolatile data storage area of the data storage device via the hardware encryption circuit;
retrieve the secure storage information table and an authentication certificate from the secure nonvolatile data storage area when access is granted to the key management system;
transmit, from the first server to a second server, a request for an encryption key corresponding to an encrypted data storage memory connected to the first server, the request including the authentication certificate;
retrieve a communication key corresponding to the encrypted data storage memory from the secure nonvolatile data storage;
receive the encryption key from the second server; and
unlock the encrypted data storage memory with the encryption key, the key management system configured to use the communication key to secure communication between the key management system and the encrypted data storage memory while performing the unlock of the encrypted data storage memory.

9. The system of claim 8 further comprising:
the system includes the first server coupled to the data storage device;
the hardware encryption circuit includes a cryptographic integrated circuit within the first server that is not within the data storage device;
an array of encrypted data storage memories within the first server;
the secure storage information table identifying whether the encrypted data storage memory has an encryption key registered with the second server; and
a memory within the first server storing a native operating system configured to operate the first server, the native operating system different than the key management system.

10. The system of claim 9 further comprising each encrypted data storage memory of the array includes a setting to activate a lock-on-power-cycle feature which forces each individual memory device of the array to become locked if there is an unexpected power event.

11. The system of claim 8 further comprising:
the key management system configured to:
determine if the data storage device has been unlocked; and
provide an error indicator when the data storage device has not been unlocked.

12. The system of claim 8 further comprising the key management system configured to establish a secure communication channel between the first server and the second server.

13. The system of claim 8 further comprising:
the key management system configured to:
implement an automatic registration mode whereby each encrypted memory connected to the first server that is not registered and does not have a corresponding authentication certificate and encryption key at the second server is automatically determined;
automatically send a request to the second server to register any unregistered encrypted memory;
generate a particular communication key corresponding to each unregistered encrypted memory;

receive a particular encryption key from the second server corresponding to each unregistered encrypted memory;

configure each encrypted memory to use the corresponding particular communication key to secure communication between the key management system and the encrypted memory when the key management system is performing the unlocking of the encrypted memory;

lock each encrypted memory with each drive's corresponding encryption key received from the second server; and update a secure storage information table to indicate each locked encrypted memory is registered.

14. The system of claim 13 further comprising:

the key management system configured to:

implement a manual registration mode whereby a user can submit a command to the key management system to have a encrypted memory that is not registered and does not have a corresponding authentication certificate and encryption key at the second server manually registered.

15. The system of claim 8 further comprising:

the data storage device configured to be connected to and removed from the first server while the first server is powered on.

16. The system of claim 8 further comprising:

the data storage device is located external to the first server; and the data storage device is configured to be physically connected and disconnected from the first server via an external interface without physically modifying the first server.

17. A memory device storing instructions that when executed cause a processor to perform a method comprising:

accessing a hardware encryption circuit of a first server;

obtaining access to a secure nonvolatile data storage area of a first data storage device via the hardware encryption circuit;

retrieving an authentication certificate from the secure nonvolatile data storage area when access is granted;

transmitting, from the first server to a second server, a request for an encryption key corresponding to a second data storage device connected to the first server, the request including the authentication certificate;

retrieving a communication key from the secure nonvolatile data storage area;

receiving the encryption key from the second server; and unlocking the second data storage device with the encryption key while, during the unlocking, securing communication with the second data storage device via the communication key; and retrieving a secure storage information table stored within the secure nonvolatile data storage area, the secure storage information table identifying data storage devices and corresponding encryption keys registered with the second server.

18. The memory device of claim 17 further comprising the secure storage information table identifying an indication of which server data storage controller data storage devices are associated with.

19. The memory device of claim 17 further comprising the method including implementing an automatic registration mode when a data storage device is detected that does not have an encryption key registered with the second server.

* * * * *